US012777324B2

(12) United States Patent
Lee et al.

(10) Patent No.: US 12,777,324 B2
(45) Date of Patent: Oct. 27, 2026

(54) ELECTRONIC DEVICE FOR PERFORMING COMMUNICATION CONNECTION WITH EXTERNAL ELECTRONIC DEVICE AND METHOD FOR OPERATING SAME

(71) Applicant: SAMSUNG ELECTRONICS CO., LTD., Suwon-si (KR)

(72) Inventors: Giho Lee, Suwon-si (KR); Gupil Cheong, Suwon-si (KR); Juyeon Jin, Suwon-si (KR); Doosuk Kang, Suwon-si (KR); Bokun Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 288 days.

(21) Appl. No.: 18/528,623

(22) Filed: Dec. 4, 2023

(65) Prior Publication Data

US 2024/0107293 A1 Mar. 28, 2024

Related U.S. Application Data

(63) Continuation of application No. PCT/KR2022/006506, filed on May 6, 2022.

(30) Foreign Application Priority Data

Jun. 4, 2021 (KR) ........................ 10-2021-0072916

(51) Int. Cl.
*H04W 8/24* (2009.01)
*H04W 76/11* (2018.01)

(52) U.S. Cl.
CPC .............. *H04W 8/24* (2013.01); *H04W 76/11* (2018.02)

(58) Field of Classification Search
CPC ......... H04W 8/24; H04W 76/11; H04W 4/80; H04W 8/005; H04W 76/14; H04W 88/02
See application file for complete search history.

(56) References Cited

U.S. PATENT DOCUMENTS 9,807,491 B2 10/2017 Kim
10,299,300 B1 5/2019 Young
(Continued)

FOREIGN PATENT DOCUMENTS

CN 108174457 B 9/2020
EP 3157265 A2 4/2017
(Continued)

OTHER PUBLICATIONS

International Search Report and Written Opinion for International Application No. PCT/KR2022/006506; International Filing Date May 6, 2022; Date of Mailing Aug. 10, 2022; 12 Pages.
(Continued)

*Primary Examiner* — Angelica Perez
(74) *Attorney, Agent, or Firm* — CANTOR COLBURN LLP

(57) ABSTRACT

Disclosed is an electronic device for performing coupling between external electronic devices. An electronic device may include a transceiver, a display, and at least one processor operatively coupled to the transceiver and the display. The processor may be configured to receive, from a first external electronic device, device capability information and coupling information, receive, from a second external electronic device, device capability information and coupling information, decide whether the first external electronic device and the second external electronic device are operable as a set, decide whether to display a user interface for the coupling, display the user interface for the coupling through the display, identify a user input through the user interface for the coupling, displayed through the display, and
(Continued)

transmit first connection information to the first external electronic device and transmit second connection information to the second external electronic device, in response to identifying the user input.

13 Claims, 22 Drawing Sheets

(56) References Cited

U.S. PATENT DOCUMENTS

| | | | | |
|---|---|---|---|---|
| 12,526,857 | B2 * | 1/2026 | Cheong | H04W 76/14 |
| 2006/0274747 | A1 | 12/2006 | Duchscher et al. | |
| 2012/0202425 | A1 | 8/2012 | Glezerman et al. | |
| 2013/0316649 | A1 | 11/2013 | Newham | |
| 2015/0124976 | A1 * | 5/2015 | Pedersen | A61N 1/36038 381/23.1 |
| 2016/0029114 | A1 | 1/2016 | Chen | |
| 2016/0323678 | A1 * | 11/2016 | Pontoppidan | H04R 25/552 |
| 2016/0360350 | A1 | 12/2016 | Watson et al. | |
| 2016/0381214 | A1 * | 12/2016 | Messenger | H04M 15/70 455/415 |
| 2017/0238103 | A1 | 8/2017 | Gehring et al. | |
| 2018/0067712 | A1 * | 3/2018 | Behzadi | G06F 3/0484 |
| 2018/0184206 | A1 | 6/2018 | Dusse et al. | |
| 2018/0220241 | A1 * | 8/2018 | Naumann | H04R 25/554 |
| 2018/0341448 | A1 | 11/2018 | Behzadi et al. | |
| 2018/0375990 | A1 * | 12/2018 | Chandrasekaran | H04L 51/224 |
| 2019/0289381 | A1 | 9/2019 | Chawan et al. | |
| 2020/0107184 | A1 | 4/2020 | Giles et al. | |
| 2020/0288292 | A1 * | 9/2020 | Cheong | H04W 76/15 |
| 2020/0379713 | A1 * | 12/2020 | Carrigan | G06F 3/165 |
| 2021/0144244 | A1 * | 5/2021 | Duarte | G06F 3/0481 |

FOREIGN PATENT DOCUMENTS

| | | | |
|---|---|---|---|
| JP | 2012165375 | A | 8/2012 |
| KR | 101253799 | B1 | 4/2013 |
| KR | 20160143572 | A | 12/2016 |
| KR | 20190137953 | A | 12/2019 |

OTHER PUBLICATIONS

Korean Office Action; Application No. 10-2021-0072916 filed Jun. 4, 2021; mailed Jul. 21, 2025; 15 pages, with English Translation.

* cited by examiner

ELECTRONIC DEVICE FOR PERFORMING COMMUNICATION CONNECTION WITH EXTERNAL ELECTRONIC DEVICE AND METHOD FOR OPERATING SAME

CROSS-REFERENCE TO RELATED APPLICATIONS

This application is a continuation of International Application No. PCT/KR2022/006506, designating the United States, filed on May 6, 2022, in the Korean Intellectual Property Receiving Office and claiming priority to Korean Patent Application No. 10-2021-0072916, filed on Jun. 4, 2021, in the Korean Intellectual Property Office, the disclosures of which are incorporated by reference herein in their entireties.

TECHNICAL FIELD

The disclosure relates to an electronic device for establishing a communication connection with an external electronic device and an operating method thereof.

BACKGROUND ART

With the development of digital technologies, various electronic devices, such as an earphone, an earbud, a wireless speaker, or a wireless headset, are being distributed to output audio data reproduced in audio source devices, such as a Personal Digital Assistant (PDA), an electronic organizer, a smartphone, a smartphone, a tablet Personal Computer (PC), or a wearable device. The electronic device may receive the audio data from the audio source device through a wireless communication connection with the audio source device.

Regarding the aforementioned wireless communication connection technology, Bluetooth standard technologies define a protocol for short-range wireless communication between electronic devices. Under a Bluetooth network environment, the electronic devices may transmit or receive a data packet including content such as text, voice, images, or video in a designated frequency band. For example, a User Equipment (UE), such as a smartphone, a tablet, a desktop computer, or a laptop computer, may transmit the data packet to another UE or an accessory device. Each of the external electronic devices (e.g., a pair of wireless earphones, a wireless speaker, etc.) may produce a communication link (e.g., an Audio over Bluetooth Low Energy (AoBLE) topology) independent of the UE (e.g., the smartphone) and may provide the same service for the same purpose.

DISCLOSURE OF INVENTION

Technical Problem

Seamless and intuitive management of the various independent communication links between external electronic devices communicatively coupled to a User Equipment (UE) can be difficult due to the independence of those links (connections) from the perspective of the UE. For example, the external electronic devices may be wearable devices that do not include their own user interface for managing such connections.

Solution to Problem

Based on the aforementioned discussion, the disclosure provides an apparatus and method for performing coupling between external electronic devices.

In addition, the disclosure provides an apparatus and method for updating or releasing coupling information between external electronic devices.

In addition, the disclosure provides a user interface for performing coupling between external electronic devices and/or updating or releasing coupling information.

An electronic device according to an embodiment of the disclosure may include a transceiver, a display, and at least one processor operatively coupled to the transceiver and the display. The at least one processor may be configured to receive, from a first external electronic device, device capability information and coupling information of the first external electronic device, receive, from a second external electronic device, device capability information and coupling information of the second external electronic device, decide whether the first external electronic device and the second external electronic device are operable as a set, based on the device capability information of the first external electronic device and the device capability information of the second external electronic device, decide whether to display a user interface for the coupling, based on the coupling information of the first external electronic device and the coupling information of the second external electronic device upon deciding that the first external electronic device and the second external electronic device are operable as the set, display the user interface for the coupling through the display upon deciding to display the user interface for the coupling, identify a user input through the user interface for the coupling, displayed through the display, and transmit first connection information to the first external electronic device and transmit second connection information to the second external electronic device, in response to identifying the user input.

In addition, a method of operating an electronic device according to an embodiment of the disclosure may include receiving, from a first external electronic device, device capability information and coupling information of the first external electronic device, receiving, from a second external electronic device, device capability information and coupling information of the second external electronic device, deciding whether the first external electronic device and the second external electronic device are operable as a set, based on the device capability information of the first external electronic device and the device capability information of the second external electronic device, deciding whether to display a user interface for the coupling, based on the coupling information of the first external electronic device and the coupling information of the second external electronic device upon deciding that the first external electronic device and the second external electronic device are operable as the set, displaying the user interface for the coupling through the display upon deciding to display the user interface for the coupling, identifying a user input through the user interface for the coupling, displayed through the display, and transmitting first connection information to the first external electronic device and transmitting second connection information to the second external electronic device, in response to identifying the user input.

In addition, an external electronic device according to an embodiment of the disclosure may include a transceiver and at least one processor operatively coupled to the transceiver. The at least one processor may be configured to transmit a message including device capability information and coupling information to an electronic device, receive connection information produced based on the device capability information and the coupling information from the electronic device, transmit a third communication link connection request message to a different external electronic device, and receive a third communication link connection response message from the different external electronic device.

Advantageous Effects of Invention

An electronic device and an operating method thereof according to various embodiments of the disclosure define signaling for performing coupling of external electronic devices not subjected to coupling and provide a user interface, thereby effectively connecting the external electronic devices.

In addition thereto, advantages acquired in the disclosure are not limited to the aforementioned advantages, and other advantages not mentioned herein may be clearly understood by those skilled in the art to which the disclosure pertains from the following descriptions.

MODE FOR CARRYING OUT THE INVENTION

Terms used in the disclosure are for the purpose of describing particular embodiments only and are not intended to limit other embodiments. A singular expression may include a plural expression unless there is a contextually distinctive difference. All terms (including technical and scientific terms) used herein have the same meaning as commonly understood by those ordinarily skilled in the art disclosed in the disclosure. It will be further understood that terms, such as those defined in commonly used dictionaries, should be interpreted as having a meaning that is consistent with their meaning in the context of the relevant art, and will not be interpreted in an idealized or overly formal sense unless expressly so defined herein. Optionally, the terms defined in the disclosure should not be interpreted to exclude the embodiments of the disclosure.

A hardware-based approach is described for example in the various embodiments of the disclosure described hereinafter. However, since the various embodiments of the disclosure include a technique in which hardware and software are both used, a software-based approach is not excluded in the embodiments of the disclosure.

Figure 1:
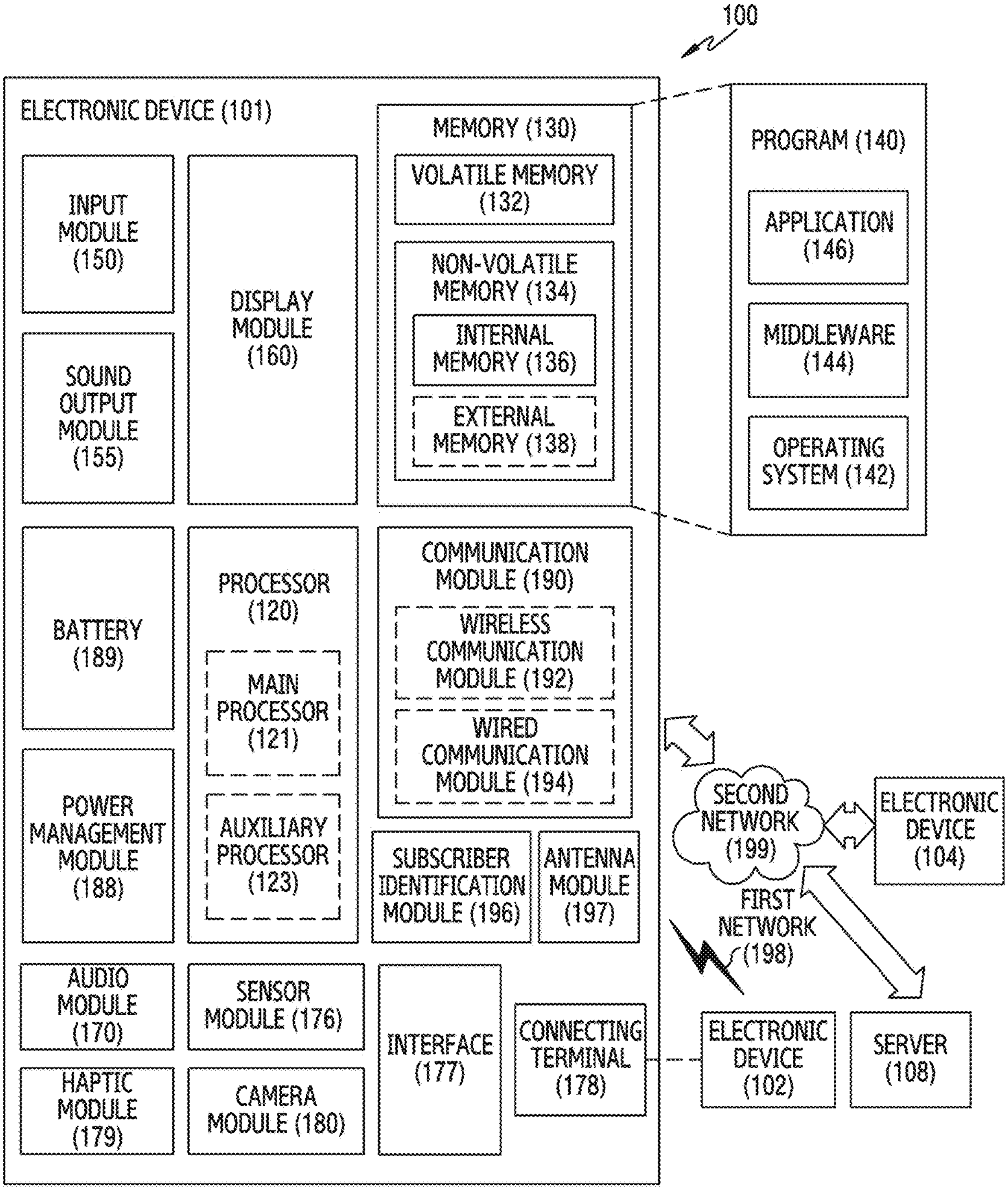
FIG. 1 illustrates a block diagram of an electronic device in a network environment according to an embodiment.

FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197. According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B,"

"at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium (e.g., the memory 130), and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

Figure 2A:
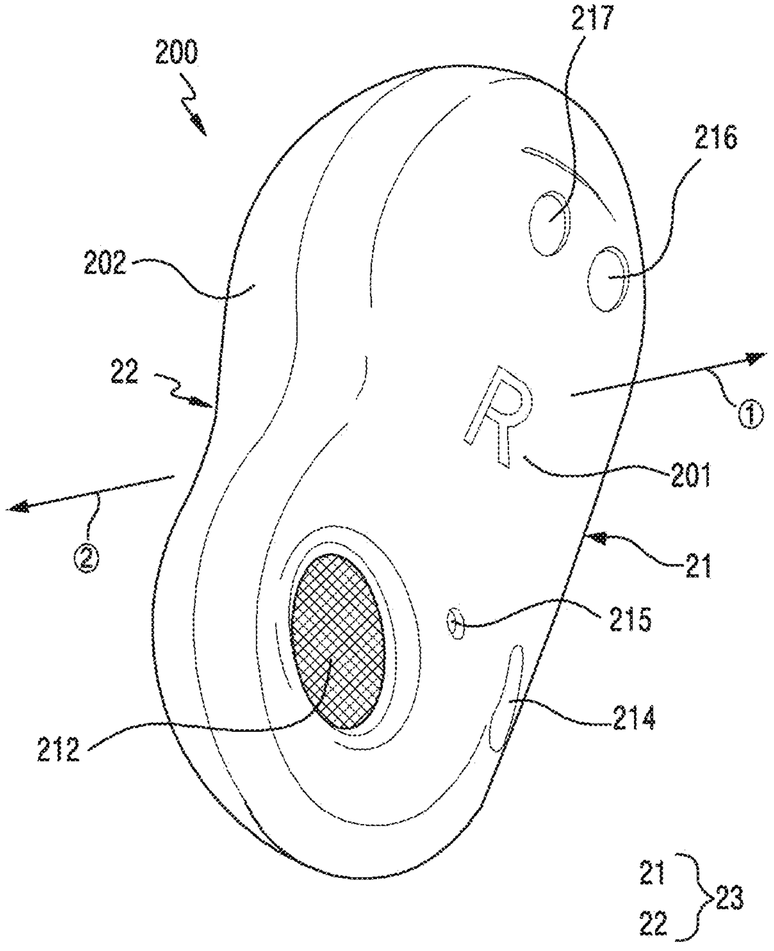
FIG. 2A to 2D illustrate an external electronic device according to an embodiment.
Figure 2B:
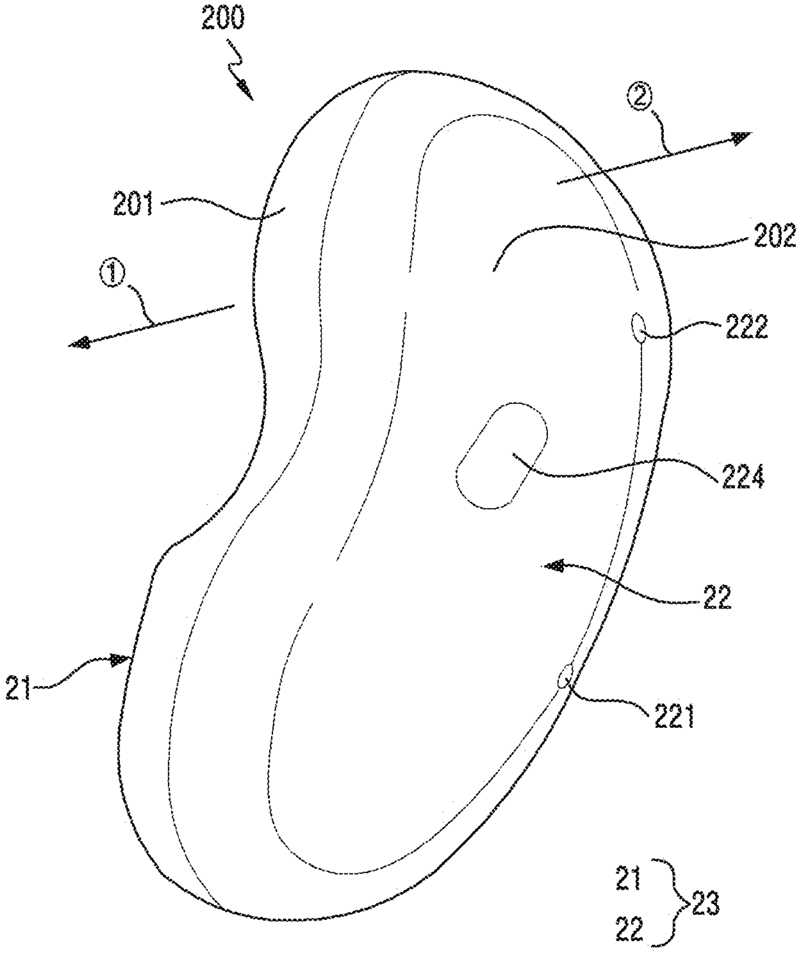
Figure 2C:
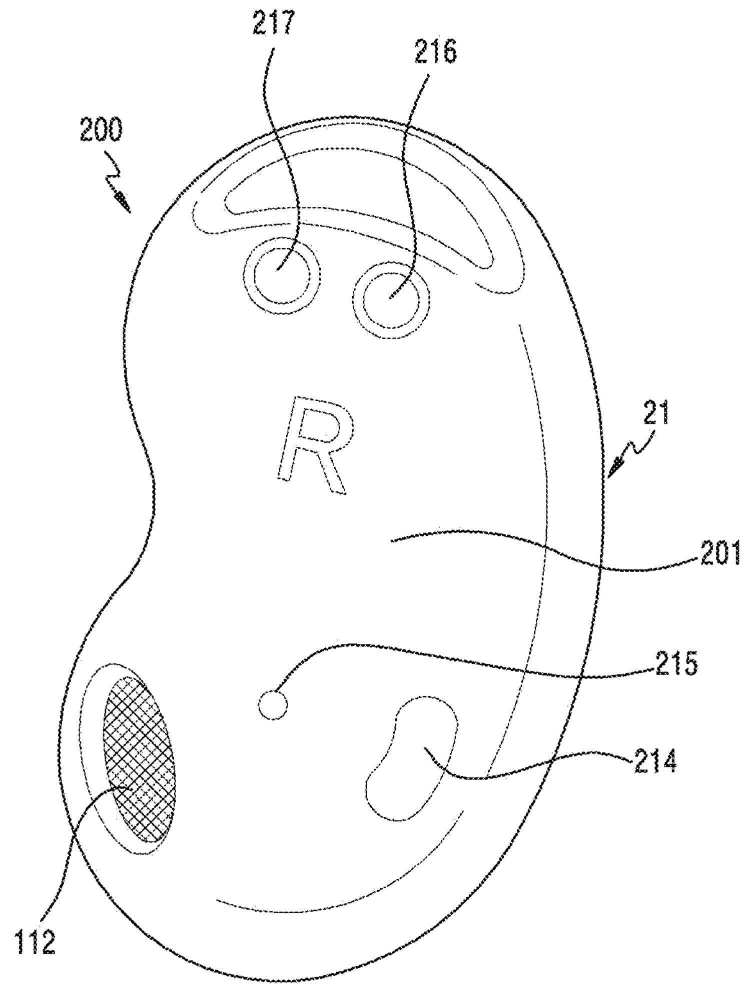

FIG. 2A and FIG. 2B are perspective views illustrating an exterior of an electronic device 200 according to an embodiment, and FIG. 2C is a plan view illustrating the exterior of the electronic device 200 according to an embodiment.

Referring to FIG. 2A to FIG. 2C, the electronic device 200 may be a wearable device which is wearable on an ear. The electronic device 200 may be a wearable device which is wearable on an external and/or internal portion of an ear of a user. For example, among a pair of wireless earphones (e.g., a left wireless earphone, a right wireless earphone), the electronic device 200 may be the right wireless earphone.

According to an embodiment, the electronic device 200 may be a wearable device which is worn on a right ear (as shown) or a left ear (not separately shown).

The electronic device 200 may include a first face 201 and a second face 202. An English alphabet "R" indicating that the electronic device 200 is the wearable device worn on the right ear may be indicated on the first face 201. Although not shown in FIG. 2A, an English alphabet "L" indicating that an electronic device paired with the electronic device 200 and configured to be worn on the left ear is the wearable device worn on the left ear may be indicated on a face opposite to the first face 201 of the electronic device 200.

According to an embodiment, the electronic device 200 may include a housing 23 having a plurality of components mounted thereon. The housing 23 may include a first housing 21 including the first face 201 facing a first direction ① and a second housing 22 including the second face 202 facing a second direction ②. The first direction ① and the second direction ② may be opposite to each other. For example, the first face 201 and the second face 202 may include a curved face in part.

According to an embodiment, the first face 201 of the first housing 21 may include a speaker nozzle portion (or an audio port having a sound hole) 212, a first port 214, and at least one of charging ports 216 and 217. Sound output from a speaker disposed inside the housing 23 may be output to the outside through the audio port 212 having the sound hole.

According to an embodiment, the speaker nozzle portion 212 may be disposed to one face (e.g., the first face 201, the second face 202) of the housing 23 so that the sound output from the speaker disposed inside the housing 23 is output (or propagated) to the outside of the electronic device 200 through at least audio ports disposed to one face (e.g., the first face 201, the second face 202) of the housing 23. For example, the speaker nozzle portion 212 may be disposed to the first face 201 of the first housing 21 so that the sound output from the speaker disposed inside the housing 23 is output (or propagated) to the outside of the electronic device 200 through at least one of audio ports disposed to the first face 201 of the first housing 21. The speaker nozzle portion 212 may include at least one of opening portions, and may be constructed of a metal material and/or a polymer material. The speaker nozzle portion 212 may include a foreign matter prevention member which prevents entering of foreign matter (e.g., dust, moisture). The speaker nozzle portion 212 may be exposed to the outside of the electronic device 200 through at least in part of the first face 201.

According to an embodiment, the first port 214 may include a leakage port. The first port 214 may be exposed to the outside of the electronic device 200 through at least in part of the first face 201.

According to an embodiment, at least one of the charging ports 216 and 217 may be disposed in pair to one face (e.g., the first face 201, the second face 202) of the housing 23, and may be exposed to the outside of the electronic device through the face. For example, at least one of the charging ports 216 and 217 may be exposed to the outside of the electronic device 200 through the first face 201 of the housing 23.

According to an embodiment, the electronic device 200 may include a sensor (e.g., a proximity sensor, a biometric sensor) which detects whether the electronic device 200 is worn by a user. A sensor window 215 may be disposed to one face (e.g., the first face 201, the second face 202) of the housing 23. For example, the sensor window 215 may be disposed to the first face 201 of the first housing 21. For example, the sensor window 215 may be disposed between the speaker nozzle portion 212 and the first port 214. The sensor window 215 is not limited in position to the aforementioned example. The sensor window 215 may be understood as an opening portion for a sensor operation of detecting whether the electronic device 200 is worn by the user.

According to an embodiment, the second face 202 of the second housing 22 may include at least one of microphone holes 221 and 222 and a second port 224.

According to an embodiment, at least one of the microphone holes 221 and 222 may be disposed to one face (e.g., the first face 201, the second face 202) of the housing 23 so that a microphone disposed inside the housing 23 acquires sound. For example, at least one of the microphone holes 212 and 222 may be disposed to the second face 202 of the second housing 22 so that the microphone disposed inside the housing 23 acquires sound.

According to an embodiment, the second port 224 is a port related to the output of the speaker, and may be understood as a port utilized for low-band specific tuning of the speaker. The second port 224 may be disposed to a speaker back volume space facing the second direction ②.

According to an embodiment, at least part of content described through FIG. 2A to FIG. 2C under the premise that the electronic device 200 is the wearable device worn on the right ear may also be equally applied even if the electronic device 200 is the wearable device worn on the left ear, based on a symmetric characteristic.

Figure 2D:
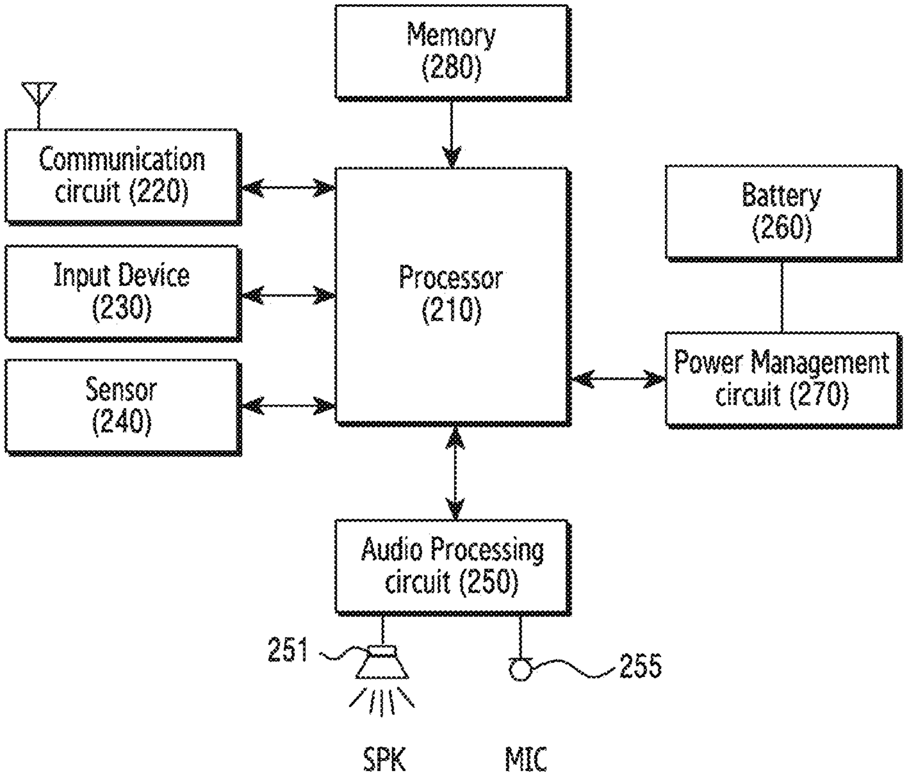

FIG. 2D is a block diagram of the electronic device 200 according to an embodiment. In an embodiment, components of FIG. 2D may be included in the electronic device 200. Although not shown in the figure, a different electronic device paired with the electronic device 200 and worn on the left ear may also include corresponding components of the electronic device 200. For convenience of explanation, the electronic device 200 may be referred to as a first external electronic device, and the different electronic device may be referred to as a second external electronic device.

Referring to FIG. 2D, the electronic device (e.g., the first external electronic device, the second external electronic device) may include a processor 210, a communication circuit 220, an input device 230, a sensor 240, an audio processing circuit 250, a speaker 251, a microphone 255, a battery 260, a power management circuit 270, memory 280, and/or a combination thereof.

In an embodiment, the processor 210 may provide overall control to the electronic device 200. The processor 210 may receive data of a different component (e.g., the communication circuit 220, the input device 230, the audio processing circuit 250, the power management circuit 270, or the memory 280) of the electronic device 200, may interpret the received data, and may perform calculations according to the interpreted data.

In an embodiment, the processor 210 may control the communication circuit 220 so that the electronic device 200 (e.g., the first external electronic device, the second external electronic device) establishes a wireless communication connection (e.g., Bluetooth pairing) with the electronic device 101. In an embodiment, the wireless communication connection may be a link through which bidirectional communication between the electronic device 200 (e.g., the first external electronic device, the second external electronic device) and the electronic device 101 is possible. In an embodiment, the processor 210 may receive data from the electronic device 101 by using the communication circuit 220, and may transmit to the electronic device 101 a response (e.g., ACK or NACK) indicating whether data is successfully received. In an embodiment, a wireless communication connection between the first external electronic device and the electronic device 101 may be referred to as a first communication link. In an embodiment, a wireless communication connection between the second external electronic device and the electronic device 101 may be referred to as a second communication link. In an embodiment, a wireless communication connection between the first external electronic device and the second external electronic device may be referred to as a third communication link.

In an embodiment, the processor 210 may receive data from the electronic device 101 by using the communication circuit 220 when a wireless communication connection is established between the electronic device (e.g., the first external electronic device, the second external electronic device) and the electronic device 101. In an embodiment, the data received from the electronic device 101 may be data including an audio signal.

In an embodiment, the processor 210 may provide the audio processing circuit 250 with the data from the electronic device 101. In an embodiment, the audio processing circuit 250 may convert (e.g., decode) the provided data into an audio signal, and may output the converted audio signal through the speaker 251.

In an embodiment, the processor 210 may acquire (or identify) a wireless communication parameter related to the wireless communication connection, when the wireless communication connection between the electronic device (e.g., the first external electronic device, the second external electronic device) and the electronic device 101 is established. In an embodiment, the processor 210 may store the acquired (or identified) communication parameter via the memory 280. In an embodiment, the processor 210 may transmit the communication parameter to a counterpart electronic device (e.g., the second external electronic device) through an additional wireless communication connection (e.g., the third communication link). In an embodiment, a wireless communication parameter related to the first communication link (or the second communication link)

may include address information (e.g., a Bluetooth address of a master device (e.g., the first external electronic device) of the first communication link (or the second communication link), a Bluetooth address of a user equipment (e.g., the electronic device 100), and/or a Bluetooth address of the first external electronic device), piconet clock information (Clock Native (CLKN) of the master device (e.g., the first external electronic device) of the first communication link (or the second communication link)), Logical Transport (LT) address information (e.g., information allocated by the master device (e.g., the first external electronic device) of the first communication link (or the second communication link)), used channel map information, link key information, Service Discovery Protocol (SDP) information (e.g., first communication link (or second communication link)-related service and/or profile information), and/or supported feature information. In an embodiment, the wireless communication parameter related to the first communication link (or the second communication link) may further include an Extended Inquiry Response (EIR) packet. In an embodiment, the EIR packet may include resource control information of the first communication link (or the second communication link) and/or information on manufacturers.

In an embodiment, the processor 210 may transmit a mode parameter to the counterpart electronic device (e.g., the second external electronic device) through an additional wireless communication connection. In an embodiment, when an audio signal corresponding to data from the electronic device 101 is output through the speaker 251, the mode parameter may include information on audio filters and sound effects applied to the audio signal. In an embodiment, the mode parameter may include information on an audio output level or audio output strength applied to the audio signal. In an embodiment, the mode parameter may include information on setting of an application running in relation with data in the electronic device 101. In an embodiment, the mode parameter may include information on a data channel (e.g., in case of a stereo audio signal, information on a Left (L) channel and information on a Right (R) channel).

In an embodiment, the processor 210 may transmit a wireless communication connection list to the counterpart electronic device (e.g., the second external electronic device) through an additional wireless communication connection. In an embodiment, the wireless communication connection list may include a wireless communication connection history among a plurality of external electronic devices (not shown), a wireless communication connection order, or a combination of them.

In an embodiment, the wireless communication connection list stored in the memory 280 of the first external electronic device may be referred to as a first wireless communication connection list. In an embodiment, the wireless communication connection list stored in the memory 280 of the second external electronic device may be referred to as a second wireless communication connection list.

In an embodiment, the processor 210 of the electronic device (e.g., the first external electronic device) may receive the wireless communication parameter, the mode parameter, the wireless communication connection list, or a combination of them from the counterpart electronic device (e.g., the second external electronic device) through the additional wireless communication connection.

In an embodiment, the processor 210 of the electronic device (e.g., the first external electronic device) may receive at least part of data (e.g., data related to a channel (e.g., an R channel) allocated to the second external electronic device) from the counterpart electronic device (e.g., the second external electronic device) through the additional wireless communication connection, when the wireless communication connection between the counterpart electronic device (e.g., the second external electronic device) and the electronic device 101 is established.

In an embodiment, the processor 210 may output through the speaker 251 the data received from the counterpart electronic device (e.g., the first external electronic device) through the additional wireless communication connection.

In an embodiment, the processor 210 of the external electronic device (e.g., the first external electronic device) may monitor the wireless communication connection between the counterpart electronic device (e.g., the second external electronic device) and the electronic device 101 by using the communication parameter. In an embodiment, the monitoring may refer to a state capable of attempting to receive at least part of a packet transferred through the wireless communication connection between the counterpart electronic device (e.g., the second external electronic device) and the electronic device 101 or a state capable of receiving at least part of the packet. For example, when the second external electronic device monitors the first communication link, the second external electronic device may receive or attempt to receive at least part of a packet transmitted by a user equipment (e.g., the electronic device 100) or the first external electronic device (e.g., the electronic device which has established the first communication link) through the first communication link. In this case, the user equipment (e.g., the electronic device 100) may recognize the second external electronic device by using the second communication link, but may not recognize the presence of the second external electronic device through the first communication link. In an embodiment, the first link may refer to a wireless communication connection between the first external electronic device and the electronic device 101. In an embodiment, the second communication link may refer to a wireless communication connection between the second external electronic device and the electronic device 101.

In an embodiment, the processor 210 of the external electronic device (e.g., the first external electronic device) may acquire data transmitted/received between the counterpart electronic device (e.g., the second external electronic device) and the electronic device 101 through a wireless communication connection being monitored. In an embodiment, the processor 210 may acquire the data from the electronic device 101 through the wireless communication connection being monitored. In an embodiment, the operation in which the processor 210 acquires the data from the electronic device 101 via the communication circuit 220 by using the communication parameter may also be referred to as sniffing.

In an embodiment, the processor 210 may output the data acquired from the electronic device 101 through the speaker 251. In an embodiment, the processor 210 may convert (or decode) the acquired data into an audio signal by using the audio processing circuit 250, and may output the converted audio signal through the speaker 251. In an embodiment, the processor 210 may output an audio signal related to one channel (e.g., the R channel) allocated to the electronic device (e.g., the first external electronic device) or all channels (e.g., the L channel and the R channel) among the converted audio signals through the speaker 251, according to configuration information of the electronic device (e.g., the first external electronic device).

In an embodiment, the communication circuit 220 may establish the wireless communication connection between the electronic device (e.g., the first external electronic device) and a different electronic device (e.g., the counterpart electronic device (e.g., the second external electronic device), the electronic device 100)). In an embodiment, the communication circuit 220 may receive data from the different electronic device (e.g., the counterpart electronic device (e.g., the second external electronic device), the electronic device 100) through the established wireless communication connection. In an embodiment, the communication circuit 220 may transmit data to the different electronic device (e.g., the counterpart electronic device (e.g., the second external electronic device), the electronic device 100) through the established wireless communication connection.

In an embodiment, the communication circuit 220 may access (or observe) the wireless communication connection between the counterpart electronic device (e.g., the second external electronic device) and the electronic device 101, based on a communication parameter related to the wireless communication connection between the counterpart electronic device (e.g., the second external electronic device) and the electronic device 101. In an embodiment, the communication circuit 220 may acquire data transmitted/received through the wireless communication connection being accessed (or observed).

In an embodiment, the input device 230 may receive an input from a user. In an embodiment, the input received from the user may be an input for controlling a volume of an audio signal which is output through the electronic device (e.g., the first external electronic device) or for reproducing a next song.

In an embodiment, the input device 230 may include a touch panel. In an embodiment, the input device 230 may detect a touch input or a hovering input by using the touch panel. In an embodiment, the input device 230 may include a physical key.

In an embodiment, the input device 230 may provide the processor 210 with data indicating the input received from the user.

In an embodiment, the sensor 240 may produce a sensing value for identifying a communication connection event. In an embodiment, the communication connection event may include wearing of the electronic device (e.g., the first external electronic device), detaching of the electronic device (e.g., the first external electronic device) from a case, using of the electronic device (e.g., the first external electronic device), inputting of a gesture, and a combination thereof.

In an embodiment, the audio processing circuit 250 may process a signal related to sound. In an embodiment, the audio processing circuit 250 may acquire a sound signal (e.g., a user's voice signal) through the microphone 255. In an embodiment, the audio processing circuit 250 may convert the sound signal acquired through the microphone 255 into an analog audio signal (or an electric signal) corresponding to the sound signal. In an embodiment, the audio processing circuit 250 may encode the analog audio signal into a digital audio signal by using a codec. In an embodiment, the audio processing circuit 250 may provide a different component (e.g., the processor 210, the communication circuit 220, and/or the memory 280) of the electronic device (e.g., the first external electronic device) with the digital audio signal.

In an embodiment, the audio processing circuit 250 may receive the digital audio signal from the different component (e.g., the processor 210, the communication circuit 220, an interface, and/or the memory 280) of the electronic device (e.g., the first external electronic device). In an embodiment, the audio processing circuit 250 may convert the digital audio signal into an analog audio signal through a converter (e.g., a Digital-to-Analog Converter (DAC)). In an embodiment, the audio processing circuit 250 may decode the digital audio signal into the analog audio signal by using the codec. In an embodiment, the audio processing circuit 250 may output a sound signal corresponding to the analog audio signal through the speaker 251.

In an embodiment, the battery 260 may supply power to at least one component of the electronic device (e.g., the first external electronic device). In an embodiment, the battery 260 may be charged when the electronic device (e.g., the first external electronic device) is placed (or connected) to a specified charging device (e.g., a case (not shown)).

In an embodiment, the power management circuit 270 may manage power supplied to the electronic device (e.g., the first external electronic device) through the battery 260. For example, the power management circuit 270 may be configured as at least part of a Power Management Integrated Circuit (PMIC).

In an embodiment, the power management circuit 270 may measure a power level of the battery 260 of the electronic device (e.g., the first external electronic device). In an embodiment, the power management circuit 270 may provide the processor 210 with information on the power level of the battery 260. In an embodiment, the processor 210 may transmit, to the electronic device 101, information on a remaining power level of the battery 260 of the electronic device (e.g., the first external electronic device). In an embodiment, the power level of the battery 260 of the electronic device (e.g., the first external electronic device) may be used by the electronic device (e.g., the first external electronic device) to negotiate with a counterpart electronic device (e.g., the second external electronic device) and a master device. In an embodiment, one of the electronic device (e.g., the first external electronic device) and the counterpart electronic device (e.g., the second external electronic device) may be determined as a master device, and the other electronic device may be determined as a slave device, based on the power level of the electronic device (e.g., the first external electronic device) and the counterpart electronic device (e.g., the second external electronic device).

Figure 3:
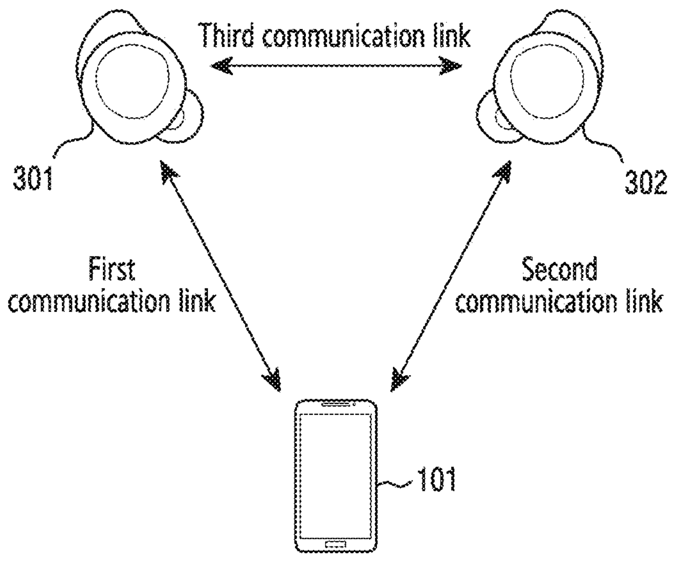
FIG. 3 illustrates an example of a connection between an electronic device and external electronic devices according to an embodiment.

FIG. 3 illustrates an example of a connection between an electronic device and external electronic devices according to an embodiment. Referring to FIG. 3, the external electronic devices (e.g., a first external electronic device 301, a second external electronic device 302) and an electronic device 101 may establish a wireless communication connection with each other. The first external electronic device 301 and the second external electronic device 302 illustrated in FIG. 3 may be the electronic device 200 of FIG. 2A to FIG. 2D. The electronic device 101 of FIG. 3 may be a device corresponding to the electronic device 101 of FIG. 1.

Referring to FIG. 3, a communication link may be established between the electronic device 101 and the first external electronic device 301, and a communication link may be established between the electronic device 101 and the second external electronic device 302. The communication link established between the electronic device 101 and the first external electronic device 301 may be referred to as a first communication link, and the communication link established between the electronic device 101 and the second external electronic device 302 may be referred to as a second communication link. In addition, a communication link may also be established between the first external electronic device 301 and the second external electronic device 302, and may be referred to as a third communication link. In another embodiment, the third communication link may not be established.

In an embodiment, upon identifying the communication connection event, the electronic device 101 may establish the wireless communication connection with at least one external electronic device (e.g., the first external electronic device 301) among the external electronic devices. For example, the communication connection event may include wearing of the external electronic device (e.g., the first external electronic device 301), detaching of the external electronic device (e.g., the first electronic device 301) from a case, using of the external electronic device (e.g., the first external electronic device 301), inputting of a gesture, and a combination thereof.

Various embodiments of the disclosure relate to a method for coupling between electronic devices using Bluetooth, a method of releasing/updating the coupling, and a method for providing a user interface capable of inducing setting and releasing of the coupling. Although wireless earphones (e.g., ear buds) are taken for example in the disclosure, this is only an example, and the scope of the disclosure is not limited thereto. For example, the electronic device of the disclosure and the method of operating the electronic device may include a wireless speaker, a wireless headset, an earphone, and a method of operating them.

In the following description, 'coupling' may mean that two or more independent external electronic devices are wirelessly connected to each other to provide the same service. In other words, this means that two or more independent external electronic devices (e.g., the first external electronic device 301 and the second external electronic device 302) are connected to each other to operate as one set (e.g., a paired set).

In order for the external electronic devices to be coupled, each of the external electronic devices shall be a device to which coupling is possible, and the external electronic devices may have to perform an operation of storing coupling information (e.g., coupling ID, synced ID) of respective counterpart electronic devices as coupling information thereof. For convenience of explanation, a pair of wireless earphones (e.g., ear buds) may be taken for example. The pair of ear buds may be constructed of two ear buds. Each of the ear buds may be one of a left ear bud which outputs information on a Left (L) channel and a right ear bud which outputs information on a Right (R) channel. When the two ear buds are ear buds which output information on the same directional channels (e.g., when both of them are left ear buds), coupling cannot be performed. In other words, the coupling may be possible only when the left ear bud and the right ear bud operate as one pair (e.g., as a set having, in combination, a L channel and an R channel).

In addition, in order for the external electronic devices to be coupled to each other, each of the external electronic devices may store coupling information (e.g., coupled ID, synced ID) of each other. For example, taking one pair of ear buds (constructed of a left ear bud and a right ear bud) for example, the left ear bud may store coupling information of the right ear bud (e.g., a coupled ID and Bluetooth address of the right ear bud), and the right ear bud may have to perform an operation of storing coupling information of the left ear bud (e.g., a coupled ID and Bluetooth address of the left ear bud).

In order for the external electronic devices to smoothly operate as one set, mutual coupling needs to be performed. For coupling of the external electronic devices, each of the external electronic devices needs to store UE capability information and coupling information of a different external electronic device. As used herein, a "different" external electronic device as used in this context means the other device of the pair or set of devices configured to operate as a set.

The following description illustrates an operation of an electronic device, first external electronic device, and second external electronic device for a wireless connection among the electronic device, the first external electronic device, and the second external electronic device and for coupling between the first external electronic device and the second external electronic device. The electronic device described hereinafter may mean the electronic device 101 of FIG. 1. In addition, the first external electronic device and the second external electronic device described hereinafter may mean the electronic device of FIG. 2A and FIG. 2B. Although two external electronic devices (the first external electronic device and the second external electronic device) are taken for example in the following description, this is only an example, and the disclosure may also be used in coupling between two or more (e.g., 3, 4, 5, 10, 15, etc.) external electronic devices.

External electronic devices which exist in a region adjacent to the electronic device may be subjected to Bluetooth scanning. The electronic device may perform the Bluetooth scanning to receive an advertising signal of the first external electronic device and an advertising signal of the second external electronic device, and may identify device capability information and coupling information of the first external electronic device and second external electronic device, respectively, based on the received advertising signal. In addition, the electronic device may establish a first communication link with the first external electronic device and establish a second communication link with the second external electronic device, based on the advertising signal received from the first external electronic device and the second external electronic device.

The electronic device may compare the coupling information and device capability information of the first external electronic device and second external electronic device at a time of establishing the first communication link and the second communication link or at a specific time after establishing the first communication link and the second communication link. For example, upon identifying that coupling information of one of the first external electronic device and second external electronic device is set to "Null", it may be decided that coupling is necessary between the first external electronic device and the second external electronic device. In addition, for example, when the first external electronic device and the second external electronic device have different coupling information and when channel direction information included in device capability information is different from each other, the electronic device may decide that the coupling is necessary between the first external electronic device and the second external electronic device. In some embodiments, one or both of the first external electronic device and the second external electronic device can provide device capability information and/or coupling information specifying the device as a pairable device. In some embodiments, for example, when the first external electronic device and the second external electronic device have different coupling information and when the device capability information and/or coupling information specifies either device as a pairable device, the electronic device may decide that the coupling is necessary between the first external electronic device and the second external electronic device. In some embodiments, one or both of the first external electronic device and the second external electronic device can provide device capability information and/or coupling information specifying the device as a pairable device and an identifier for one or more previously paired devices.

As such, upon deciding that the coupling is necessary between the first and second external electronic devices connected to the electronic device, the electronic device may display a user interface capable of inducing the coupling to a user. This is because the user may recognize that the two external electronic devices are connected for the purpose of coupling.

When the electronic device displays the user interface capable of inducing the coupling and detects an input of the user for performing the coupling through the displayed user interface, the electronic device may additionally perform operations necessary for initiating and/or completing the coupling between the first external electronic device and the second external electronic device. In this operation, the electronic device may transfer information (e.g., a Bluetooth address (BD_ADDR), synced ID, coupled ID) of the second external electronic device to the first external electronic device. Similarly, the electronic device may transfer information (e.g., a Bluetooth address (BD_ADDR), synced ID, coupled ID) of the first external electronic device to the second external electronic device.

The operation in which the electronic device performs the coupling between the first external electronic device and the second external electronic device may be displayed to the user through a User Experience (UX), and the electronic device may display a providable service, based on coupling information or a result obtained by performing the coupling, through the UX for each situation.

In an embodiment, the external electronic device may transmit an advertising signal to an adjacent electronic device or another external electronic device to advertise coupling information and device capability information.

In an embodiment, the external electronic device may transfer the coupling information or the device capability information to the electronic device at a time of establishing a communication link with the electronic device or at a specific time before or after establishing the communication link.

In an embodiment, upon receiving a coupling request from the electronic device, the external electronic device may accept or reject the request. For example, when the external electronic device accepts the coupling request, a Bluetooth address of a different external electronic device, transferred from the electronic device, may be updated in the coupling information. In addition, for example, the external electronic device may perform Bluetooth signal scanning or paging to receive a connection request signal transferred from the different external electronic device, or may attempt a connection request to establish a third communication link with the second external electronic device.

According to an embodiment of the disclosure, the external electronic devices may perform mutual coupling. The coupling between the external electronic devices may be performed in a processing stage, or may be performed after the processing stage.

According to an embodiment, the coupling may also be performed in production and/or processing stages of the external electronic devices. In the processing stage, device capability information and coupling information may be stored in the external electronic device.

According to an embodiment, the coupling of the external electronic devices may be performed based on a predetermined process in a service center. A case where a user of an ear bud loses a left bud and thus purchases a new left bud may be taken for example. In order to use the new left bud together with the existing right bud, the user may visit the service center to perform coupling of the left bud and the right bud. Coupling information (e.g., peer device's BE_ADDR/LE_ADDR, synced ID) may be stored in the external electronic devices by using a predetermined tool.

According to an embodiment, the coupling of the external electronic devices may also be performed by using a cradle on or in which the external electronic devices are mounted. For coupling of the external electronic devices, when the user uses the cradle, the coupling of the external electronic devices may be performed by an operation of a specific sequence capable of storing mutual coupling information in the external electronic devices.

In addition, for example, the user may connect each of the left bud and the right bud to a smartphone, and may perform coupling between these two external electronic devices according to an operation based on a user interface. Coupling information and device capability information may be stored or changed in the external electronic devices according to the operation based on the user interface.

Figure 4:
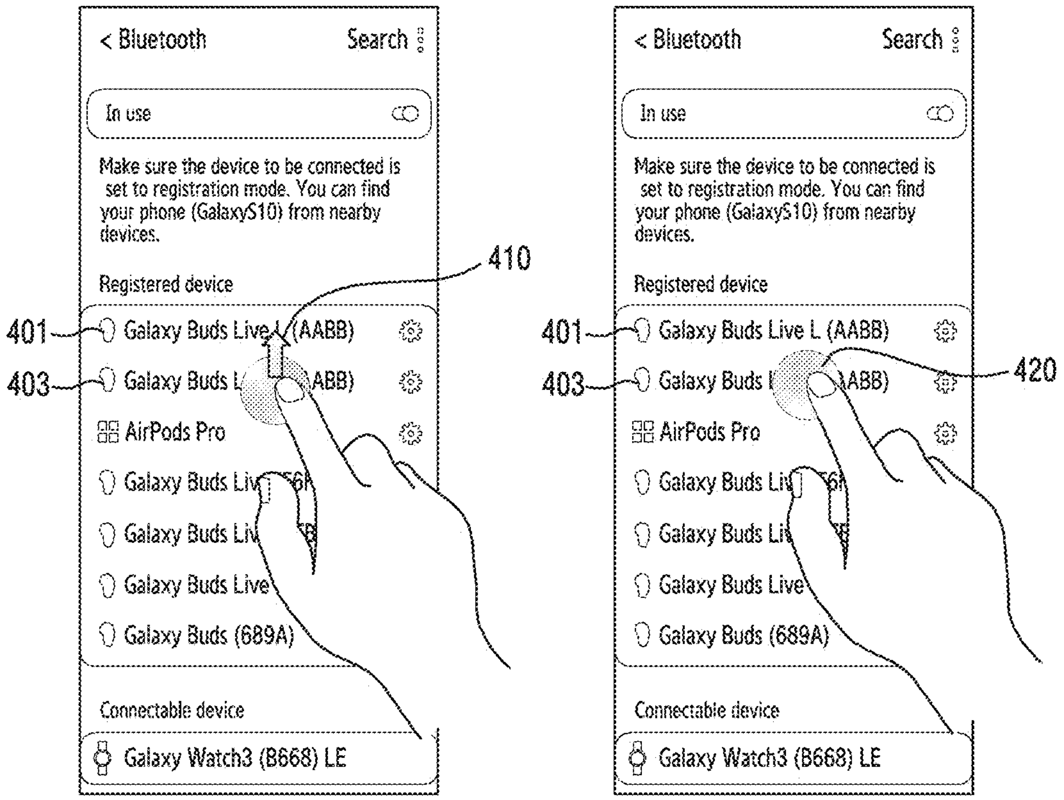
FIG. 4 illustrates a user interface according to an embodiment.

FIG. 4 illustrates a user interface according to an embodiment.

An electronic device may display a user interface for a Bluetooth connection. The user interface may include information necessary for the Bluetooth connection and an object for identifying a user input for the Bluetooth connection. The user interface of FIG. 4 is only an example, and the scope of the disclosure is not limited thereto.

In an embodiment, the user interface may include an object for enabling (ON/OFF) a Bluetooth connection function. For example, referring to FIG. 4, the user interface may include a slide bar displayed side by side with 'in use', as the object for enabling the Bluetooth connection function.

In an embodiment, the user interface may include a registration device list including an object indicating a registered registration device. The registration device list may refer to a list of electronic devices registered for a Bluetooth connection with the electronic device. For example, referring to FIG. 4, the user interface may include a list which enumerates the registered devices, such as a 'Galaxy Buds Live L (AABB)' 401, a 'Galaxy Buds Live R 403', and 'AirPods Pro', as the registration devices registered to the electronic device.

In an embodiment, the user interface may include an object indicating each of the external electronic devices as constituting one part of a set of external electronic devices. When a set of external electronic devices (e.g., a pair of ear buds) constructed of two or more external electronic devices is registered to the electronic device, an object indicating each of the external electronic devices (e.g., the left ear bud, the right ear bud) constituting the pair of external electronic devices may be separately included in the user interface. For example, referring to FIG. 4, a pair of external electronic devices is not displayed in a list of registerable devices as an object indicating one set but may be included as separate objects such as the 'Galaxy Buds Live L(AABB)' 401 and the 'Galaxy Buds Live R(AABB)' 403.

In an embodiment, the user interface may include a list including an object indicating connectable devices. The connectable device list may include electronic devices to which a Bluetooth connection with the electronic device is possible. For example, referring to FIG. 4, the user interface may include an object such as 'Galaxy Watch3 (B668) LE', as a device connectable to the electronic device.

In an embodiment, the electronic device may enable/disable a Bluetooth connection function, based on a user interface identified in the object for enabling the Bluetooth connection function. For example, upon identifying a user input in which a slide bar related to the Bluetooth connection function is set to a first direction, the electronic device may enable the Bluetooth connection function. In addition, for example, upon identifying a user input in which the slide bar related to the Bluetooth connection function is set to a second direction, the electronic device may disable the Bluetooth connection function.

In an embodiment, the electronic device may perform paring of a registration device with respect to the electronic device (or another registration device, or another external device) or coupling with respect to the registration device, based on the user input identified in the object indicating the registration device. For example, referring to FIG. 4, a user's drag action 410 for the object 403 indicating an external electronic device (e.g., Galaxy Buds Live R(AABB)) and the object 401 indicating an external electronic device (e.g., Galaxy Buds Live L(AABB)) may be identified to perform coupling of the external electronic device indicated by the object 403 and the external electronic device indicated by the object 401. In addition, for example, referring to FIG. 4, a user's touch 420 for the object 403 indicating the external electronic device (e.g., Galaxy Buds Live R(AABB)) may be identified to perform coupling of the external electronic device indicated by the object 403. The operation of the electronic device for performing the coupling of the external electronic device will be described below in detail with reference to FIG. 7 and FIG. 8.

In an embodiment, the electronic device may perform coupling between the external electronic devices, and may display a user interface for releasing the coupling between the external electronic devices when necessary for a user.

In an embodiment, the electronic device may perform the coupling between the external electronic devices, and may display a user interface including an object indicating a state of the coupling. For example, the electronic device may display a user interface including an object indicating that the coupling is complete. In addition, for example, the electronic device may display a user interface including an object indicating that the coupling is released. In addition, for example, the electronic device may display a user interface including an object indicating information of the coupled external electronic devices.

In an embodiment, based on properties of the external electronic device or information related to a distance between the electronic device and the external electronic device, the electronic device may provide a user with a User Experience (UX) and a User Interface (UI) to update coupling information and device capability information. For example, the UI and the UX may be provided to guide the user that mutual coupling between the external electronic devices having similar properties is possible. In addition, for example, based on location information corresponding to a designated range based on a Received Signal Strength Indication (RSSI) of the external electronic devices, the UI and the UX may be provided to guide the user that the coupling of the external electronic devices within the designated range is possible. In addition, for example, based on designated distance information or the like using Ultra-Wideband (UWB) communication or the like, the UI and the UX may be provided to guide the user that the coupling of the external electronic devices is possible. In addition, for example, when the electronic device detects that the distance between the electronic device and the external electronic devices is close enough to enable the coupling, the UI and the UX may be provided to guide the user that the coupling of the external electronic devices is possible.

In an embodiment, for the coupling between the external electronic devices, coupling information and device capability information may be stored in the external electronic devices.

In an embodiment, in order for the external electronic device to operate as a part of one set, the coupling information may refer to necessary information of the external electronic device, stored in the external electronic device, and information of a different external electronic device.

TABLE 1

| Byte | Item | Contents | Example |
|---|---|---|---|
| 0 | Version | SW version | 0x07 |
| 1 | Device Capabilities | Mono/Stereo/Surround Channels | Refer to Device Capabilities |
| 3~10 | Synced ID | 0~1 Vendor ID/2~9 Synced ID | 0x01 08 84 72 55 4F |
| 11~16 | Coupled device ID | Coupled device ID | 0x01 08 84 72 55 4F |
| 17 | Feature Map | BIS/BIG/CIS | 0000 0111 |
| 18~19 | Render Delay | Latency to Audio output | 0x01 2C (300 ms) |
| 20~23 | User security info | Password to manage Items | 0x19 79 02 06 |
| 24~25 | Supported Codec | G.722/LC3/Vendor specific codec ID | 0000 0000 0000 0011 |

Table 1 is an example of attribute information of the external electronic device, stored in the external electronic device. The version of Table 1 may refer to version information of software being used by the external electronic device, and the device capabilities may refer to channel information supported by the external electronic device. The synced ID of Table 1 may refer to an identifier of a device synchronized to the external electronic device, and the coupled device ID may refer to an identifier of a device coupled to the external electronic device. The feature map of Table 1 may refer to data input and output to the external electronic device, and the render display may refer to latency information of the external electronic device. The user security info may refer to security information (e.g., an encryption key for updating coupling information) of a user using the external electronic device, and the supported codec may refer to information of codec supported by the external electronic device. The coupling information stored in the external electronic device may include the synced ID and the couple device ID in the attribute information of the external electronic device, included in Table 1.

The external electronic devices may be sold as a single product. Alternatively, or in addition, the external electronic devices may be sold as one set (e.g., a pair of ear buds). When the external electronic devices are sold as the single product, coupling information of the external electronic device may be shipped by being set to Null in a processing stage. Alternatively, the coupling information of the external electronic device may be set to Null by a user's intention or a tool of a service center. In addition, when a pairing button is included in an outer case of the external electronic device, the coupling information may be updated by using the button. In addition, when a user's specific input (e.g., a touch input for more than a specific time) is identified in a state where the external electronic device is mounted on a charger, the coupling information may be updated.

In an embodiment, the device capability information may refer to capability information of the external electronic device. The device capability information may include information related to sound effects, audio filter, and audio output strength applied to the external electronic device, including channel information and channel direction information.

TABLE 2

| Byte | Item | Contents | Example |
|---|---|---|---|
| 0 | Mono | Mono | 0 (left) |
| 1 | Binaural | Stereo | 1 (Binaural) |
| 2 | 5.1 CH | 5.1CH Surround | 0 (Not supported) |
| 3 | FR | | 0 |
| 4 | FL | | 0 |
| 5 | C | | 0 |
| 6 | RL | | 0 |
| 7 | RR | | 0 |
| 8 | SW | | 0 |
| ~15 | reserved for future | | |

Table 2 is an example of device capability information stored in the external electronic device. Data channel information (e.g., Mono, Binaural, 5.1 CH) and channel direction information (left, right, FR, FL, C, RL, RR, SW) are illustrated in Table 2. For example, when the external electronic device uses a data channel, the device capability information may be stored as Mono. In case of Mono, one piece of channel direction information may be included in the external electronic device. In addition, for example, when the external electronic device uses a stereo channel, the device capability information may be stored as Binaural. In case of Binaural, the channel direction information may include Right or Left. In addition, for example, when the external electronic device uses the 5.1 Channel (CH), the device capability information may be stored as 5.1 CH. In case of 5.1 CH, the channel direction information may include FL (front left), FR (front right), C (center), RL (rear left), RR (rear right), and SW (woofer speaker).

In an embodiment, at least one or more pieces of device capability information may be included in the external electronic device (e.g., the first external electronic device 301, the second external electronic device 302) in a processing stage, including information on whether it is a left electronic device or a right electronic device. The left electronic device may refer to an electronic device for a channel in a left direction in a stereo and/or 5.1 CH system, and the right electronic device may refer to an electronic device for a channel in a right direction in the stereo and/or 5.1 CH system. For example, when an audio signal corresponding to data from the electronic device 101 is output through the speaker 251, the at least one piece of device capability information may include information on audio filters or sound effects applied to the audio signal. In addition, for example, the at least one piece of device capability information may include information on an audio output level or audio output strength applied to the audio signal. In addition, for example, the at least one piece of device capability information may include information on setting of an application running in relation with data in the electronic device 101.

In an embodiment, the device capability information may be stored or changed in the external electronic device (e.g., the first external electronic device 301, the second external electronic device 202), when a Bluetooth connection is established to the electronic device (e.g., the electronic device 101). For example, upon receiving a Bluetooth service start request from the electronic device, the first external electronic device and the second external electronic device may change channel information of the device capability information to mono. In addition, for example, upon receiving the Bluetooth service start request from the electronic device, the first external electronic device and the second external electronic device may change channel direction information of the device capability information to Left or Right.

In an embodiment, the electronic device may store or change coupling information and device capability information of the external electronic devices (e.g., two or more speakers).

For example, a user may configure a 2CH stereo audio system by using two speakers such as Galaxy HomePod. In this case, the electronic device may store the two external electronic devices as coupled devices, and may store channel direction information (channel role) in the device capability information of each of the external electronic devices to Right/Left, respectively. In addition, for example, when information on the external electronic device is already stored in the electronic device, the electronic device may provide a menu which allows to use only some of the external electronic devices or all of the external electronic devices. In other words, the electronic device may provide a menu which allows the user to use one Galaxy Home (Galaxy Home Mini) or multiple Home Pods. In addition, for example, the electronic device may operate based on content executed in the electronic device.

Figure 5A:
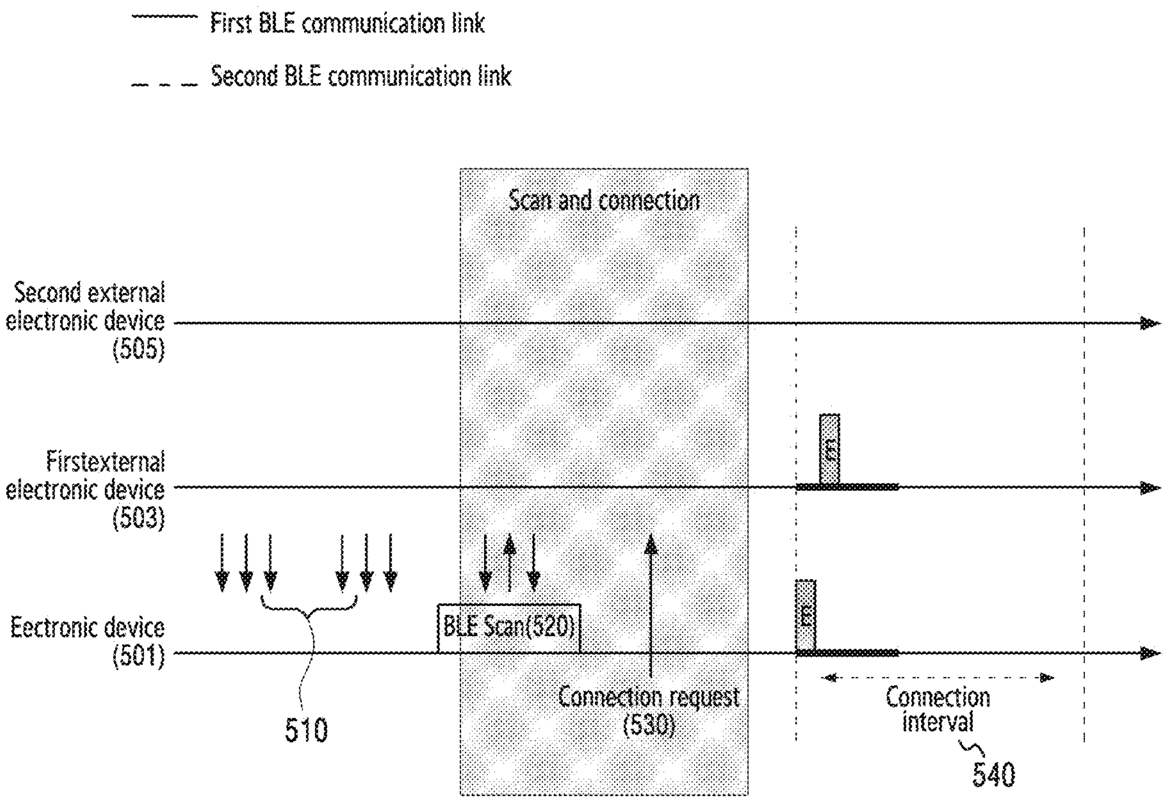
FIGS. 5A and 5B illustrate an example of a time flow for connection between an electronic device and an external electronic device according to an embodiment.

FIG. 5A illustrates an example of establishing a wireless communication link between an electronic device and an external electronic device according to an embodiment.

Referring to FIG. 5A, an electronic device 501 and a first external electronic device 503 may connect a first communication link. For example, the electronic device 501 may establish a communication link with the first external electronic device 503 by using wireless communication (e.g., Bluetooth Low Energy (BLE) communication). The first external electronic device 503 may produce an advertising signal (see 510). The electronic device 501 may perform an operation of scanning Bluetooth electronic devices adjacent to the electronic device 501 (see 520). The electronic device 501 may identify the advertising signal produced from the first external electronic device 503 through the scanning operation. After identifying the advertising signal produced from the first external electronic device 503, the electronic device 501 may determine whether to establish a wireless communication link with the first external electronic device 503. In order for the electronic device 501 to determine whether to establish the wireless communication link with the first external electronic device 503, the electronic device 501 may display a user interface related to the establishing of the communication link. When the electronic device 501 determines to establish the communication link with the first external electronic device 503, the electronic device 501 may transmit a connection request to the first external electronic device 503 (see 530). After receiving a connection request response from the first external electronic device 503, the electronic device 501 may establish the communication link.

Figure 5B:
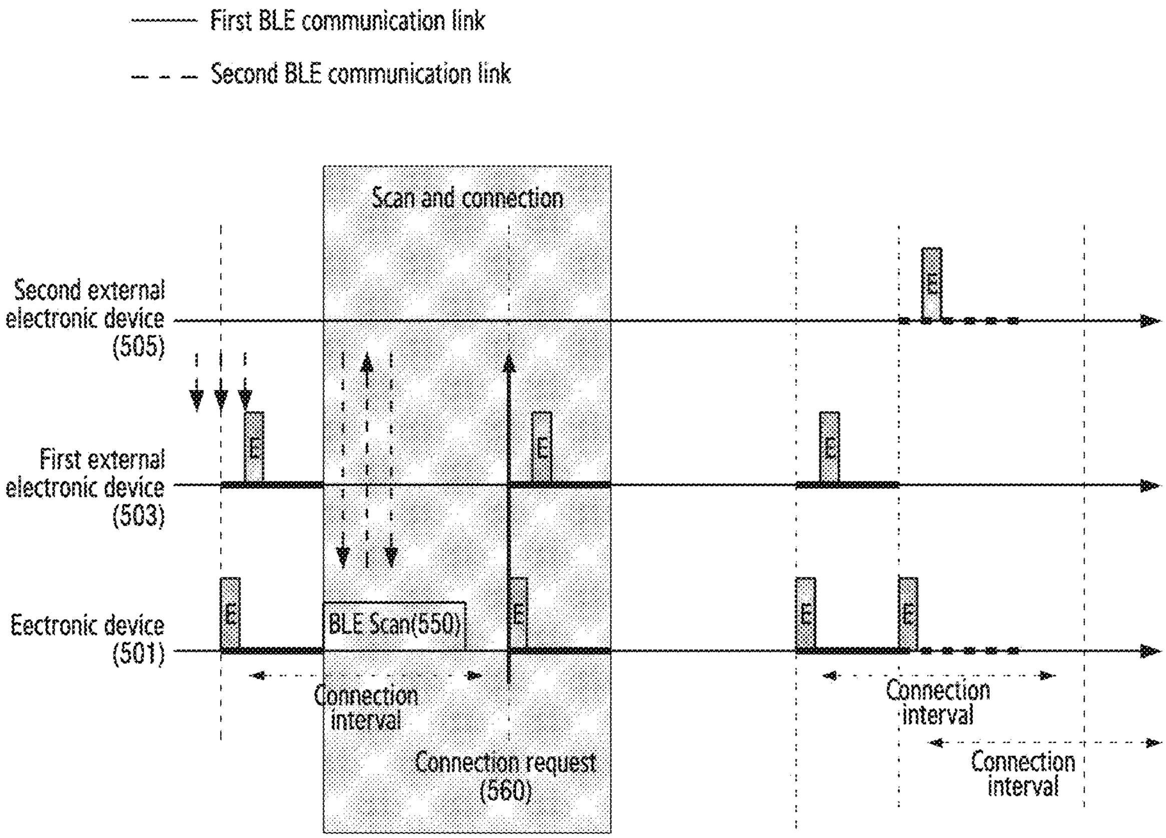

FIG. 5B illustrates an example of establishing a communication link between the electronic device 501 and a second external electronic device 505. The establishing of the communication link between the electronic device 501 and the second external electronic device 505 may correspond to the operation of establishing the communication link between the electronic device 501 and the first external electronic device 503 illustrated in FIG. 5A.

The example illustrated in FIG. 5B is an example of an operation of establishing a communication link between the electronic device 501 and the second external electronic device 505 after the communication link is established between the electronic device 501 and the first external electronic device 503.

Referring to FIG. 5B, in an embodiment, the electronic device 501 may perform an operation of scanning a different external electronic device connectable to the electronic device 501, after establishing the communication link with the first external electronic device 503 (see 550). The electronic device 501 may identify an advertising signal produced from the second external electronic device 505 through the scanning operation 550. After identifying the advertising signal produced from the second external electronic device 505, the electronic device 501 may determine whether to establish a wireless communication link with the second external electronic device 505. Upon determining to establish the wireless communication link with the second external electronic device 505, the electronic device 501 may transmit a connection request to the second external electronic device (see 560). After receiving a connection request response from the second external electronic device 505, the electronic device 501 may establish the wireless communication link with the second external electronic device 505.

In an embodiment, the first external electronic device 503 may produce the advertising signal in a multi-cast manner or in a broadcast manner (see 510). The advertising signal may be a signal for transmitting information related to a connection or account (e.g., paring) to a neighboring unspecified electronic device (e.g., a smartphone), by using wireless communication (e.g., BLE communication). The first external electronic device 503 may be stored in a separate case, and may produce the advertising signal when the case is opened in a state where the device is stored in the case.

In an embodiment, the advertising signal may include at least one of identification information of the external electronic device 501 (hereinafter, device identification device), user's account information (hereinafter, user account information), information regarding whether it is currently paired with a different device (hereinafter, current paring information), a list regarding previously paired devices (hereinafter, pairing list), information regarding devices that can be simultaneously paired (hereinafter, simultaneous pairing information), Transmit (Tx) power, information on a region detectable by the external electronic device or a remaining battery level (hereinafter, battery status information), and channel direction information (e.g., Left or Right).

In an embodiment, the first external electronic device 503 may produce an advertising signal according to a designated condition. For example, when power is supplied, the first external electronic device may output the advertising signal, based on at least one of a designated time period and a user's input.

In an embodiment, in order for the electronic device 501 to determine whether to establish the wireless communication link with the first external electronic device 503, the electronic device 501 may display a user interface related to the establishing of the communication link. When the electronic device 501 receives the advertising signal from the first external electronic device 503, the user interface for the connection with the first external electronic device 503 may be displayed on a display of the electronic device.

Figure 6:
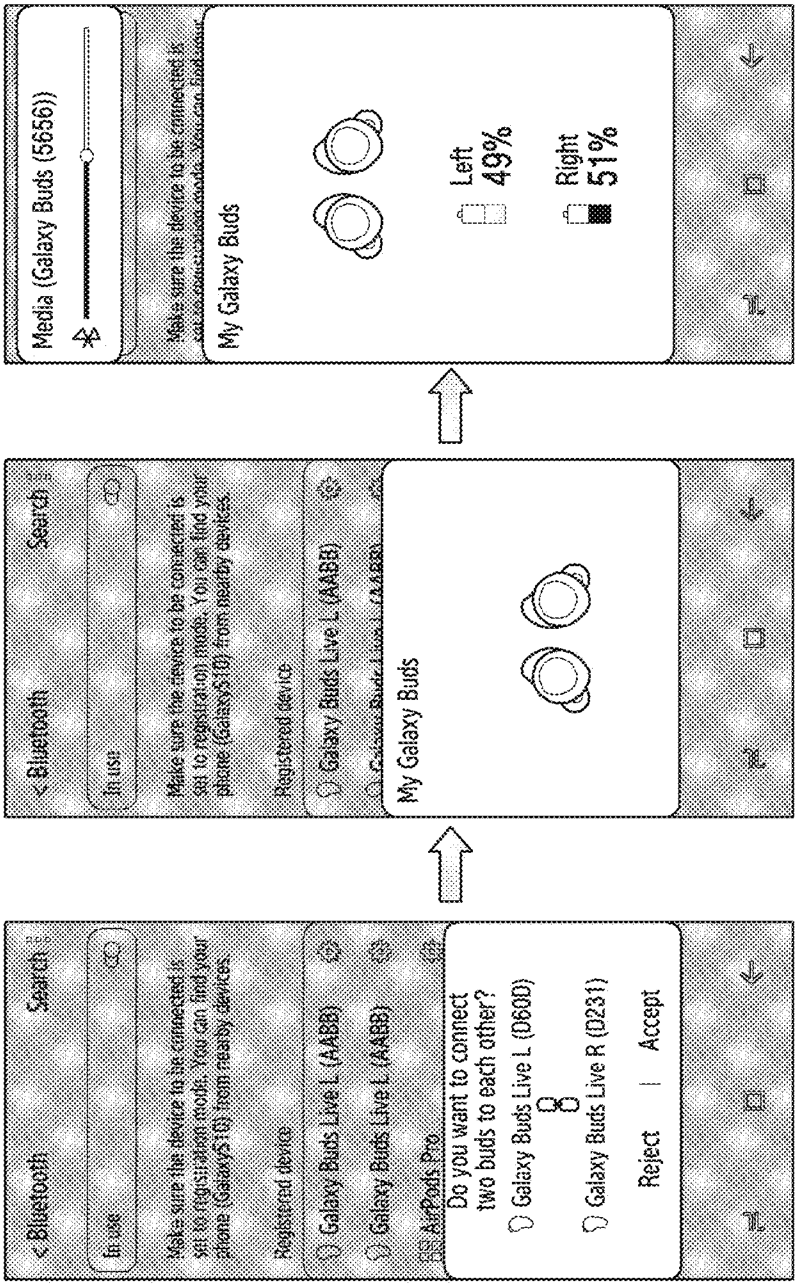
FIG. 6 illustrates an example of a user interface according to an embodiment.

FIG. 6 illustrates an example of a user interface according to an embodiment. An electronic device of FIG. 6 may be a device corresponding to the electronic device 101 of FIG. 1 and/or the electronic device 501 of FIG. 5. A first external electronic device of FIG. 6 may be a device corresponding to the first external electronic device 301 of FIG. 3 and the external electronic device 503 of FIG. 5A. A second external electronic device of FIG. 6 may be a device corresponding to the second external electronic device 302 of FIG. 2 and the second external electronic device 505 of FIG. 5A. FIG. 6 relates to an example of a flow in which the user interface is displayed to perform coupling. The user interface of FIG. 6 is only an example, and thus the scope of the disclosure is not limited thereto.

The electronic device may establish a first communication link with the first external electronic device and establish a second communication link with the second external electronic device, as described with reference to FIG. 5A and FIG. 5B. After establishing the first communication link and the second communication link, the electronic device may display a user interface for coupling the first external electronic device and the second external electronic device.

In an embodiment, in order to establish the first communication link, the electronic device may receive a scanning signal from the first external electronic device. The electronic device may transmit a connection request signal to the first external electronic device, in response to the receiving of the scanning signal. In order to establish the second communication link, the electronic device may receive the scanning signal from the second external electronic device. The electronic device may transmit the connection request signal to the second external electronic device, in response to the receiving of the scanning signal.

In an embodiment, the electronic device may decide whether the first external electronic device and the second external electronic device are operable as a set. When the electronic device decides that the first external electronic device and the second external electronic device are operable as the set, the electronic device may display a user interface for coupling of the first external electronic device and the second external electronic device, based on coupling information of the first external electronic device and coupling information of the second external electronic device, received through the first communication link and the second communication link.

The user interface for the coupling may be displayed on a display of the electronic device after identifying a user's input for an object (e.g., an object indicating the external electronic device) included in the user interface of FIG. 4.

In an embodiment, the user interface for the coupling may include an object (e.g., a popup window) for determining whether to perform coupling of the first external electronic device and the second external electronic device. The object for determining whether to perform the coupling may include information (e.g., Galaxy Buds Live L(D60d), Galaxy Buds Live R (D231)) indicating external electronic devices to be coupled. The object for determining whether to perform the coupling may include an object for receiving a user input regarding whether to perform the coupling on the external electronic devices. For example, referring to FIG. 6, an object (e.g., 'accept', 'reject') for receiving the user input regarding whether to perform the coupling may be included.

In an embodiment, the user interface for the coupling may include an object indicating that the coupling of the first external electronic device and the second external electronic device is successful. For example, referring to FIG. 6, upon identifying the user input for performing the coupling of the first external electronic device and the second external electronic device, the electronic device may recognize that the coupling is successful, by performing the operation for the coupling (described in detail with reference to FIG. 7 and FIG. 8). Upon recognizing that the coupling is successful, the electronic device may display, side by side, an object (e.g., a popup window including an icon indicating the first external electronic device and the second external electronic device) indicating that the coupling of the first external electronic device and the second external electronic device is successful.

In an embodiment, upon recognizing that the coupling of the first external electronic device and the second external electronic device is successful, the electronic device may transfer addresses of the external electronic devices through respective communication links. For example, the electronic device may transmit a Bluetooth address (coupled ID) or synced ID of the second external electronic device through a first communication link, and may transmit a coupled ID or synced ID of the first external electronic device through a second communication link.

In an embodiment, the electronic device may receive from the first external electronic device and the second external electronic device a feedback regarding whether the coupling is successful.

In an embodiment, upon receiving a feedback which indicates that the coupling is successful from the first external electronic device and the second external electronic device, the electronic device may display a user interface, which includes information indicating that the coupling is successful, on a display. For example, the electronic device may display a user interface which includes a popup or image indicating that the coupling is successful, and may display a user interface for updating a Bluetooth configuration.

In an embodiment, the user interface for the coupling may include an object indicating device information of the first external electronic device and second external electronic device. After displaying the object (e.g., the popup window including the icon indicating the first external electronic device and the second external electronic device) indicating that the coupling is successful, the electronic device may display a user interface including an object indicating device information of currently coupled external electronic devices. For example, referring to FIG. 6, the object indicating the device information of the currently coupled external electronic devices may include an object (e.g., Left: 49%, Right: 51%) indicating remaining battery level information of the currently coupled external electronic devices. In addition, for example, the object indicating the device information of the currently coupled external electronic devices may include volume information (e.g., a slide bar which indicates volume) of the external electronic devices. In addition, for example, the object indicating the device information of the coupled external electronic devices may include remaining battery level information of a case in which the external electronic devices are mounted.

In an embodiment, the coupled external electronic devices may be subjected to the coupling, based on a provided service. For example, regarding the external electronic devices (e.g., two Bluetooth speakers), when a specific application is executed, coupling for the external electronic devices may be performed, and when the specification application ends, the coupling may be released.

Figure 7:
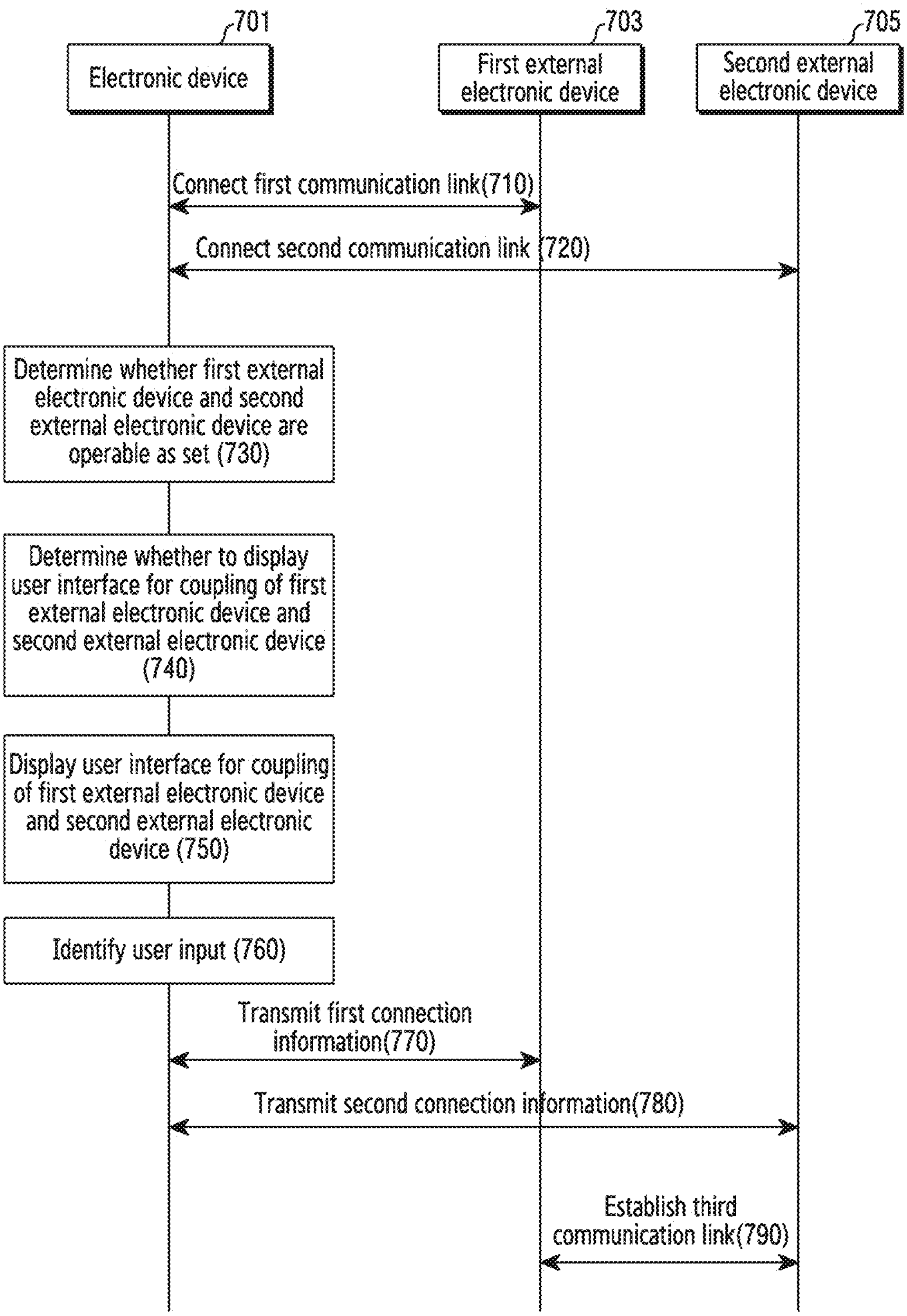
FIG. 7 illustrates an operational flow of an electronic device, a first external electronic device, and a second external electronic device according to an embodiment.

FIG. 7 illustrates an operational flow of an electronic device 701, a first external electronic device 703, and a second external electronic device 705 according to an embodiment. The electronic device 701 may be a device corresponding to the electronic device 101 of FIG. 1 and the electronic device 501 of FIG. 5. The first external electronic device 703 may be a device corresponding to the first external electronic device 301 of FIG. 3 and the device corresponding to the first external electronic device 503 of FIG. 5A. The second external electronic device 705 may be the second external electronic device 302 of FIG. 3 and the second external electronic device 505 of FIG. 5A.

Referring to FIG. 7, in operation 710, the electronic device 701 and the first external electronic device 703 may establish a first communication link. An operation performed between the electronic device 701 and the first external electronic device 703 in operation 710 may correspond to the operation of establishing the wireless communication link of FIG. 5A.

According to an embodiment, in operation 720, the electronic device 701 and the second external electronic device 705 may establish a second communication link. The operation performed between the electronic device 701 and the second external electronic device 705 in operation 720 may correspond to the operation of establishing the wireless communication link of FIG. 5B.

According to an embodiment, in operation 730, the electronic device 701 may determine whether the first external electronic device 703 and the second external electronic device 705 are operable as a set (that is, that each device can be paired to another device in a set). In operation 730, the electronic device 701 may identify device capability information of the first external electronic device 703 and device capability information of the second external electronic device 705. The electronic device 701 may identify the device capability information of the first external electronic device 703 and the second external electronic device 705 to decide whether the first external electronic device 703 and the second external electronic device 705 are operable as the set.

In an embodiment, the electronic device 701 may decide whether channel direction information of the first external electronic device 703 and channel direction information of the second external electronic device 705 cooperatively correspond to each other. As used herein, devices that can "cooperatively" correspond to each other means that each device can be paired to the other respective device to provide separate portions of the complete capability of the paired set. For example, when the electronic device 701 identifies that the channel direction information of the first external electronic device 703 is Left and the channel direction information of the second external electronic device 705 is Right, the electronic device 701 may determine that the first external electronic device 703 and the second external electronic device 705 are operable as the set (that is, the devices can be cooperatively paired). In contrast, for example, upon identifying that the first external electronic device 703 and the second external electronic device 705 have the same channel direction information (e.g., the channel direction information is Right in both the first external electronic device 703 and the second external electronic device 705, or the channel direction information is Left in both the first external electronic device 703 and the second external electronic device 705), the electronic device 701 may determine that the first external electronic device 703 and the second external electronic device 705 are not operable as the set (that is, the devices cannot be cooperatively paired, even if each device is capable of pairing). In other words, while a device might be capable of pairing to other devices generally, the device might not be capable of a particular pairing (due, e.g., to being on the same channel as the other device).

In an embodiment, the electronic device 701 may identify information on an audio system supportable by the first external electronic device 703 and the second external electronic device 705 to determine whether the first external electronic device 703 and the second external electronic device 705 are operable as the set. For example, upon identifying that both the first external electronic device 703 and the second external electronic device 705 are capable of supporting a stereo sound system, the electronic device 701 may determine that the first external electronic device 703 and the second external electronic device 705 are operable as one set. In addition, for example, upon identifying that the first external electronic device 703 and the second external electronic device 705 are capable of supporting a 5.1 CH sound system, the electronic device 701 may determine that the first external electronic device 703 and the second external electronic device 705 are operable as one set.

In an embodiment, the electronic device 701 may decide whether the first external electronic device 703 and the second external electronic device 705 are electronic devices constituting one audio system to determine that the first external electronic device 703 and the second external electronic device 705 are operable as one set. For example, upon identifying that both the first external electronic device 703 and the second external electronic device 705 support the 5.1 CH audio system and have different channel direction information (e.g., the first external electronic device 703 is FR, and the second external electronic device 705 is FL), it may be determined that the first external electronic device 703 and the second external electronic device 705 are operable as one set.

According to an embodiment, upon determining that the first external electronic device 703 and the second external electronic device 705 are operable as one set in operation 730, the electronic device 701 may determine whether to display a user interface for coupling of the first external electronic device 703 and the second external electronic device 705 in operation 740. In order to determine whether to display the user interface, the electronic device 701 may identify whether the first external electronic device 703 and the second external electronic device 705 are coupled devices. In order to identify whether the first external electronic device 703 and the second external electronic device 705 are the coupled devices, the electronic device 701 may identify coupling information of the first external electronic device 703 and the second external electronic device 705.

In an embodiment, upon identifying that coupling information identified from the first external electronic device 703 and the second external electronic device 705 is coupling information for each other, the electronic device 701 may decide that the first external electronic device 703 and the second external electronic device 705 are devices coupled already, and may determine not to display the user interface for the coupling. For example, when the first external electronic device 703 transfers a Bluetooth address of the second external electronic device 705 to the electronic device 701 as a coupled device ID and the second external electronic device 705 transfers a Bluetooth address of the first external electronic device 703 to the electronic device 701 as a coupled device ID, the electronic device 701 may decide that the first external electronic device 703 and the second external electronic device 705 are coupled devices. Accordingly, it may be determined not to display the user interface for the coupling.

In an embodiment, the electronic device 701 may identify a synced ID of the first external electronic device 703 and the second external electronic device 705 to identify that the first external electronic device 703 and the second external electronic device 705 are coupled devices. When the electronic device 701 identifies a synced ID (e.g., 01:08:84:72:55:4F) received from the first external electronic device 703, and identifies that the synced ID (e.g., 01:08:84:72:55:4F) received from the second external electronic device 705 is the same as the synced ID received from the first external electronic device 703, the electronic device 701 may decide that the first external electronic device 703 and the second external electronic device 705 are coupled devices. Accordingly, the electronic device 701 may determine not to display the user interface for the coupling.

In an embodiment, when the coupled ID and/or synced ID of the first external electronic device 703 and the second external electronic device 705 are identical, the electronic device 701 may decide that the devices are mutually coupled devices. Accordingly, the electronic device 701 may determine not to display the user interface for the coupling.

In an embodiment, upon identifying that coupling information of the first external electronic device 703 or the second external electronic device 705 is set to Null, the electronic device 701 may determine to display the user interface for the coupling.

For example, when a synced ID and coupled device ID of the first external electronic device 703 previously used by a user is 01:08:84:72:55:4F and a synced ID and coupled ID transferred by the second external electronic device 705 is Null, the electronic device 701 may decide that the first external electronic device 703 and the second external electronic device 705 are not coupled. Accordingly, the electronic device 701 may display the user interface for the coupling.

In an embodiment, the electronic device 701 may identify channel direction information of the first external electronic device 703 and the second external electronic device 705. The electronic device 701 may distinguish the first external electronic device 703 and the second external electronic device 705, based on at least one piece of information, including channel direction information included in device capability information received from the first external electronic device 703 and the second external electronic device 705.

In an embodiment, when information included in the coupling information of the first external electronic device 703 differs from information on the second external electronic device 705, the electronic device may determine to display the user interface for the coupling. In addition, when information included in the coupling information of the second external electronic device 705 differs from information on the first external electronic device 703, the electronic device may determine to display the user interface for the coupling.

In an embodiment, the electronic device 701 may decide whether the first external electronic device 703 and the second external electronic device 705 are coupled devices, based on an external device connection history previously stored. For example, when the first external electronic device 703 and the second external electronic device 705 have previously been connected to the electronic device 701, the coupling information on the first external electronic device 703 and the second external electronic device 705 may be pre-stored in the electronic device 701. In this case, when the first external electronic device 703 and the second external electronic device 705 are connected, the electronic device 701 may decide them as coupled devices, without an additional operation of identifying coupling information.

Accordingly, the electronic device 701 may determine not to display the user interface. In addition, for example, the operation of them as the coupled devices may differ depending on a specific condition such as a designated device, a designated place, or the like.

According to an embodiment, when the electronic device 701 identifies that the first external electronic device 703 and the second external electronic device 705 are devices not coupled in operation 740, the electronic device 701 may display a user interface for coupling of the first external electronic device 703 and the second external electronic device 705 in operation 750. Upon deciding that the coupling of the first external electronic device 703 and the second external electronic device 705 is necessary, the electronic device 701 may display, in a UX manner, an indication capable of inducing the coupling of the first external electronic device 703 and the second external electronic device 705 in order to identify a user's intention of coupling. An example of the user interface displayed in operation 750 will be described below in detail with reference to FIG. 11A to FIG. 11C, FIG. 12, and descriptions thereof.

According to an embodiment, when the electronic device 701 decides that the first external electronic device 703 and the second external electronic device 705 are coupled devices in operation 740, the electronic device 701 may display a user interface including an indication informing that a stereo sound system or a 5.1 CH audio service is providable by using the first external electronic device 703 and the second external electronic device 705.

In an embodiment, the user interface for coupling of the first external electronic device 703 and the second external electronic device 705 may be displayed only when the first external electronic device 703 and the second external electronic device 705 are connected to the electronic device 701 for the first time. For example, instead of displaying the user interface for the coupling whenever the first external electronic device 703 and the second external electronic device 705 are connected, the user interface for the coupling may be displayed only at a time (a bonding time) when the second external electronic device 705 is connected to the electronic device for the first time. After the time of being connected for the first time, the electronic device may identify a user's intention through a user interface for a Bluetooth configuration of the electronic device.

According to an embodiment, when the electronic device 701 displays the user interface for coupling of the first external electronic device 703 and the second external electronic device 705 in operation 750, the electronic device 701 may identify a user input for the user interface for the coupling in operation 760.

In an embodiment, the electronic device 701 may identify an input of a user intending to perform the coupling. Since the user's intention of coupling for the first external electronic device 703 and the second external electronic device 705 is identified, the electronic device 701 may perform the coupling of the first external electronic device 703 and the second external electronic device 705.

In an embodiment, the electronic device 701 may identify an input of a user intending not to perform the coupling. Since it is identified that the user intends not to perform the coupling of the first external electronic device 703 and the second external electronic device 705, the electronic device 701 may not perform the coupling of the first external electronic device 703 and the second external electronic device 705. For example, as described below with reference to FIG. 13, upon identifying the user's input for not performing the coupling, the electronic device 701 may not perform the coupling of the first external electronic device 703 and the second external electronic device 705 but use the external electronic devices by separately coupling the external electronic devices.

According to an embodiment, in operation 770, the electronic device 701 may transmit first connection information to the first external electronic device 703. The first connection information may refer to information transmitted to the first external electronic device 703 for coupling of the first external electronic device 703 and the second external electronic device 705. For example, the first connection information may include at least one of a Bluetooth address, device identifier, and device capability information of the second external electronic device 705. As another example, when the first external electronic device 703 and the second external electronic device 705 are mounted on a cradle, connection information may be transferred through a Programmable Logic Controller (PLC).

According to an embodiment, in operation 780, the electronic device 701 may transmit second connection information to the second external electronic device 705. The second connection information may refer to information transmitted to the second external electronic device 705 for coupling of the first external electronic device 703 and the second external electronic device 705. For example, the second connection information may include at least one of a Bluetooth address, device identifier, and device capability information of the first external electronic device 703.

The aforementioned first connection information and second connection information may refer to information on the second external electronic device 705 and the first external electronic device 703, but may be information randomly produced by the electronic device 701 for coupling of the first external electronic device 703 and the second external electronic device 705. For example, after producing any coupling identifier, the electronic device 701 may transmit it to each of the first external electronic device 703 and the second external electronic device 705.

In an embodiment, the first external electronic device 703 and the second external electronic device 705 may store coupling information by using a Bluetooth address (e.g., BD_ADDR) or coupling identifier of a counterpart external electronic device, transferred from the electronic device 701. In other words, the first external electronic device 703 may store the second external electronic device 705 as a coupled device, based on information of the second external electronic device 705, included in the first connection information. In addition, the second external electronic device 705 may store the first external electronic device 703 as a coupled device, based on information of the first external electronic device 703, included in the second connection information.

In an embodiment, when there is a connection with a different electronic device after performing the coupling or when there is a request from the existing electronic device 701, the first external electronic device 703 and the second external electronic device 705 may use stored coupling information so that the coupling information indicates that the coupling is established to the counterpart external electronic device.

According to an embodiment, in operation 790, the first external electronic device 703 and the second external electronic device 705 may establish a third communication link. The third communication link may refer to a wireless communication link between the first external electronic device 703 and the second external electronic device 705. In order to establish the third communication link, the first external electronic device 703 and the second external electronic device 705 may transmit/receive a mutual connection request/response.

In an embodiment, the third communication link may be used to adjust time synchronization of the first external electronic device 703 and the second external electronic device 705. Since each of the first external electronic device 703 and the second external electronic device 705 operates by receiving a signal from the electronic device 701, synchronization may not match due to a relative positional difference of the electronic device 701. The first external electronic device 703 and the second external electronic device 705 may be synchronized to each other through the third communication link.

In an embodiment, the third communication link may be used for transferring a signal received from the electronic device 701. For example, when strength of a signal received by an external electronic device (e.g., the first external electronic device 703) from the electronic device 701 decreases to be less than or equal to a specific value, for effective signal reception, the external electronic device (e.g., the first external electronic device 703) may receive the signal through a different external electronic device (e.g., the second external electronic device 705), instead of receiving the signal directly from the electronic device 701. In this case, the external electronic device may receive the signal from the different external electronic device through the third communication link.

Figure 8:
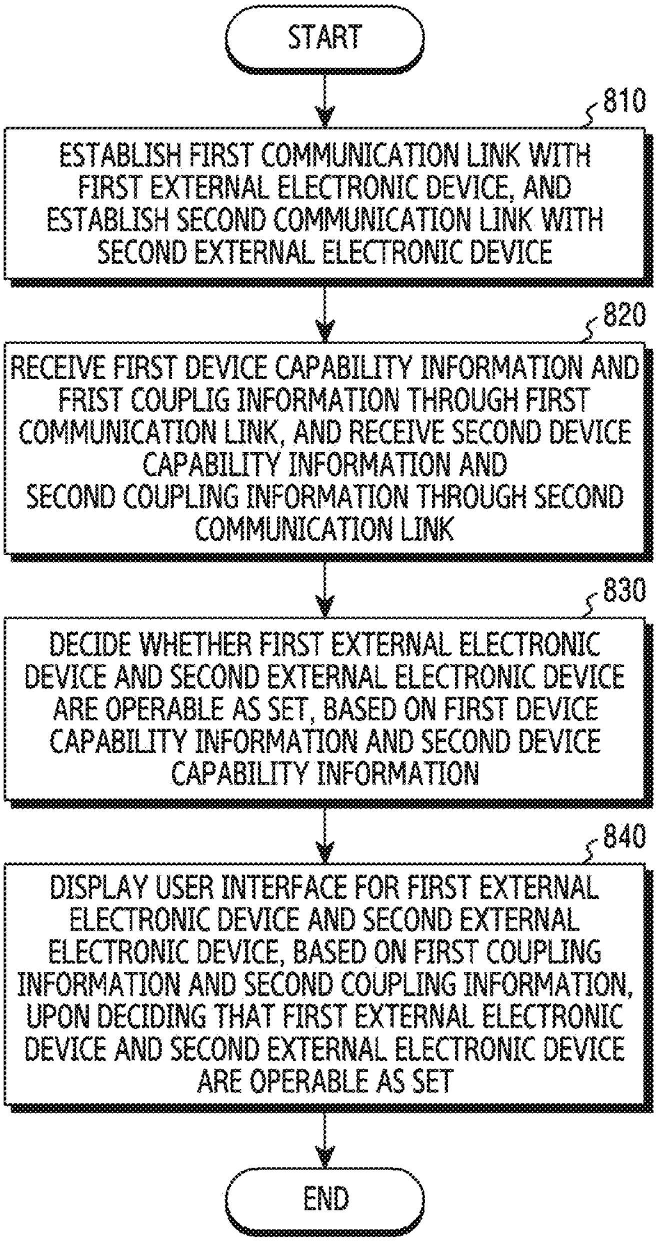
FIG. 8 illustrates an operational flow of an electronic device for coupling according to an embodiment of the disclosure.

FIG. 8 illustrates an operational flow of an electronic device according to various embodiments of the disclosure. The electronic device described in the disclosure with reference to FIG. 8 may be a device corresponding to the electronic device 101 of FIG. 1, the electronic device 501 of FIG. 5, and the electronic device 701 of FIG. 7. In addition, a first external electronic device described in the disclosure with reference to FIG. 8 may be a device corresponding to the first external electronic device 301 of FIG. 3, the first external electronic device 503 of FIG. 5A, and the first external electronic device 703 of FIG. 7. In addition, a second external electronic device described in the disclosure with reference to FIG. 8 may be the second external electronic device 302 of FIG. 3, the second external electronic device 505 of FIG. 5A, and the second external electronic device 705 of FIG. 7.

According to an embodiment, in operation 810, a first communication link may be established with the first external electronic device, and a second communication link may be established with the second external electronic device.

The first communication link may refer to a wireless communication path between the electronic device and the first external electronic device, and the second communication link may refer to a wireless communication link between the electronic device and the second external electronic device.

In an embodiment, the electronic device may receive a scanning signal from the first external electronic device in order to establish the first communication link with the first external electronic device, and may transmit a connection request signal to the first external electronic device in response thereto. The electronic device may receive from the first external electronic device a connection response signal for the connection request signal. The electronic device may establish the first communication link with the first external electronic device, based on receiving of the connection response signal from the first external electronic device. The electronic device may perform an operation similar to the operation of establishing the first communication link with the first external electronic device to establish the second communication link.

According to an embodiment, in operation 820, the electronic device may receive first device capability information and first coupling information through the first communication link, and may receive second device capability information and second coupling information through the second communication link. The first device capability information may refer to capability information of the first external electronic device, and the second device capability information may refer to device capability information of the second external electronic device. The first coupling information may refer to coupling information of the first external electronic device, and the second coupling information may refer to coupling information of the second external electronic device.

In an embodiment, the device capability information may refer to capability information of the external electronic device. The device capability information may include information related to sound effects, audio filter, and audio output strength applied to the external electronic device, including channel information (mono, stereo, 5.1 CH) and channel direction information (e.g., Left or Right).

In an embodiment, in order for the external electronic device to operate as one set, the coupling information may refer to necessary information of the external electronic device, stored in the external electronic device, and information of a different external electronic device. For example, in the presence of the different external electronic device coupled to the external electronic device, the coupling information may include an identifier of the different electronic device. In addition, for example, in the absence of the different external electronic devices coupled to the external electronic device, the coupling information may have a Null value. When the coupling information has the Null value, it may mean that there is no different external electronic devices currently coupled to the external electronic.

According to an embodiment, in operation 830, the electronic device may determine whether the first external electronic device and the second external electronic device are operable as a set, based on first device capability information and second device capability information. In order to decide whether the first external electronic device and the second external electronic device are operable as the set, the electronic device may identify the first device capability information and the second device capability information. Accordingly, the electronic device may decide whether the two external electronic devices are complementary devices, so that the two external electronic devices provide the same service.

In an embodiment, the electronic device may identify channel direction information (e.g., left, right). Channel direction information (e.g., left, right) of the first external electronic device may be included in the first device capability information, and channel direction information (e.g., left, right) of the second external electronic device may be included in the second device capability information. For example, when the electronic device identifies that the channel direction information of the first external electronic device is ‘Left’ and the channel direction information of the second external electronic device is ‘Right’, the electronic device may decide that the two external electronic devices are operable as a set. In addition, for example, when the electronic device identifies that the channel direction information of the first external electronic device is ‘Left’ and the channel direction information of the second external electronic device is 'Left', the electronic device may decide that the two external electronic devices are not operable as the set.

In an embodiment, the electronic device may identify information of an audio channel supporting the first external electronic device and the second external electronic device. The audio channel information of the first external electronic device may be included in the first device capability information, and the audio channel information of the second external electronic device may be included in the second device capability information. For example, when the electronic device identifies that both the first external electronic device and the second external electronic device support a stereo channel, the electronic device may decide that the two external electronic devices are operable as a set. In addition, for example, when the first external electronic device supports only a mono channel and the second external electronic device supports only a 5.1 CH, the electronic device may decide that the two external electronic devices are not operable as the set.

According to an embodiment, upon deciding in operation 830 that the first external electronic device and the second external electronic device are operable as the set, in operation 840, the electronic device may display a user interface for coupling of the first external electronic device and the second external electronic device, based on first coupling information and second coupling information.

In an embodiment, the electronic device may determine whether to display the user interface for the coupling. In order to determine whether to display the user interface for the coupling, the electronic device may identify whether the first external electronic device and the second external electronic device are already coupled to each other. When the electronic device decides that the first external electronic device and the second external electronic device are already coupled, the electronic device may not display the user interface for coupling of the first external electronic device and the second external electronic device. When the electronic device decides that the first external electronic device and the second external electronic device are not coupled, the electronic device may display the user interface for coupling of the first external electronic device and the second external electronic device.

In an embodiment, in order to identify whether the first external electronic device and the second external electronic device are coupled to each other, the electronic device may identify first coupling information and second coupling information.

For example, when an identifier (e.g., a Bluetooth address, a device identifier) of the second external electronic device is included in the first coupling information and an identifier of the first external electronic device is included in the second coupling information, the electronic device may decide that the first external electronic device and the second external electronic device are coupled. In addition, upon identifying that coupling information of any one external electronic device, i.e., the first external electronic device or the second external electronic device, is Null, the electronic device may decide that the first external electronic device and the second external electronic device need to be coupled. In addition, for example, when the coupling information of the first external electronic device is not related to that of the second external electronic device, the electronic device may decide that the first external electronic device and the second external electronic device need to be coupled.

In an embodiment, when the first coupling information and/or the second coupling information are in an initialized state, the electronic device may automatically perform coupling without having to additionally display the user interface for coupling of the first external electronic device and the second external electronic device. For example, when the coupled ID and/or synced ID of the first external electronic device is in an initialized state (e.g., Null), an operation for coupling of the first external electronic device and the second external electronic device may be automatically performed without having to display an additional popup window for the coupling.

In an embodiment, the electronic device may display the user interface for the coupling. The user interface for the coupling may refer to a UI/UX for inducing the coupling between the connected external electronic devices.

In an embodiment, a user input may be identified from the user interface for the coupling.

In an embodiment, the user interface for the coupling may include information on external electronic devices (e.g., the first external electronic device, the second external electronic device) connected to the electronic device. For example, a name of the external electronic device (e.g., Galaxy buds live), an identifier, an identification number (e.g. D60d, D231), a type of the external electronic device, and channel direction information of the external electronic device (e.g., Left (L), Right (R)) may be included.

In an embodiment, the user interface for the coupling may include an object capable of receiving a user input regarding whether to perform the coupling of the first external electronic device and the second external electronic device. For example, the user interface for the coupling may include an icon (e.g., 'accept', 'reject') for a decision on whether to perform the coupling. If the user input is made through an icon corresponding to 'accept', the electronic device may additionally perform the operation for the coupling. If the user input is made through an icon corresponding to 'reject', the electronic device may not perform the coupling.

In an embodiment, the user interface for the coupling may include content for updating coupling information of the external electronic device connected to the electronic device. For example, the user interface for the coupling may display coupling information of the external electronic device (e.g., the first external electronic device) connected to the electronic device. The coupling information of the external electronic device may include information of a different external electronic device (e.g., the second external electronic device) currently connectable. The user interface may include an icon (e.g., a slide bar) for receiving a user input indicating that the external electronic device intends to perform coupling with the different external electronic device. Upon receiving the user input indicating that the external electronic device intends to perform the coupling of the different external electronic device through the icon, the electronic device may perform the coupling between the external electronic device and the different external electronic device. Upon not receiving the user input indicating that the external electronic device intends to perform the coupling of the different external electronic device through the icon, the electronic device may not perform the coupling between the external electronic device and the different external electronic device.

In an embodiment, the electronic device may transmit first connection information to the first external electronic device through the first communication link and transmit second connection information to the second external electronic device through the second communication link, in order to perform the coupling of the first external electronic device and the second external electronic device. The first connection information and the second connection information may refer to information required for the coupling of the first external electronic device and the second external electronic device.

In an embodiment, the first connection information may include information of the second external electronic device, transmitted to the first external electronic device. In addition, the second connection information may include information of the first external electronic device, transmitted to the second external electronic device. For example, the first connection information may include a Bluetooth address (e.g., BD_ADDR) and/or device identifier of the second external electronic device. The second connection information may include a Bluetooth address and/or device identifier of the first external electronic device.

In an embodiment, the first external electronic device may set a device coupled to the first external electronic device as the second external electronic device, based on the information of the second external electronic device, included in the first connection information. The second external electronic device may set a device coupled to the second external electronic device as the first external electronic device, based on the information of the first external electronic device, included in the second connection information.

In an embodiment, the electronic device may randomly produce identification information (e.g., coupled ID, synced ID) to be used in the coupling of the first external electronic device and the second external electronic device, and may transmit the identification information to the first external electronic device and the second external electronic device. The identification information may be included in each of the first connection information and the second connection information. The first external electronic device and the second external electronic device may configure coupling information, based on the identification information included in the received connection information. Accordingly, the first external electronic device and the second external electronic device may be coupled.

Figure 9:
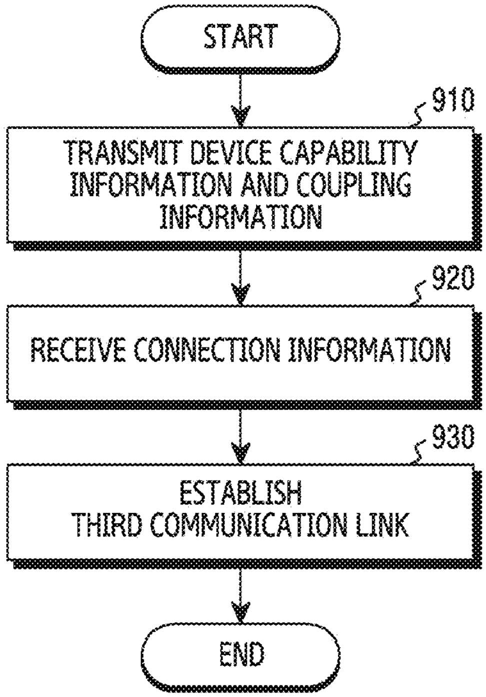
FIG. 9 illustrates an operational flow of an external electronic device for coupling according to an embodiment of the disclosure.

FIG. 9 illustrates an operational flow of an external electronic device according to an embodiment of the disclosure. The external electronic device of FIG. 9 may be a device corresponding to the external electronic device of FIG. 2A, FIG. 2B, and FIG. 3 (e.g., the electronic device 200, the first external electronic device 301, the second external electronic device 302), the external electronic device of FIG. 5A (e.g., the first external electronic device 503, the second external electronic device 505), the external electronic device of FIG. 7 (e.g., the first external electronic device 703, the second external electronic device 705), and the first external electronic device and the second external electronic device of FIG. 8.

In an embodiment, the external electronic device may establish a communication link with the electronic device. In order to establish the communication link with the electronic device, the external electronic device may transmit a scanning signal to adjacent electronic devices. The external electronic device may receive a connection request signal from the electronic device. The external electronic device may transmit a connection response signal to the electronic device, in response to the receiving of the connection request signal from the electronic device.

According to an embodiment, in operation 910, the external electronic device may transmit device capability information and coupling information to the electronic device. The device capability information may refer to capability information of the external electronic device. The device capability information may include information related to sound effects, audio filter, and audio output strength applied to the external electronic device, including channel information (mono, stereo, 5.1 CH) and channel direction information (e.g., Left or Right). In order for the external electronic device to operate as one set, the coupling information may refer to necessary information of the external electronic device, stored in the external electronic device, and information of a different external electronic device. For example, in the presence of the different external electronic device coupled to the external electronic device, the coupling information may include an identifier of the different electronic device. In addition, for example, in the absence of the different external electronic devices coupled to the external electronic device, the coupling information may have a Null value. When the coupling information has the Null value, it may mean that there is no different external electronic device currently coupled to the external electronic device.

In an embodiment, the device capability information and the coupling information may be included in an advertising signal transmitted in order for the external electronic device to be wirelessly connected to an adjacent electronic device (e.g., a smartphone). The electronic device may identify the presence of the external electronic device, based on the advertising signal. After identifying the presence of the external electronic device, the electronic device may establish a wireless communication link with the external electronic device. For example, the electronic device may transmit a connection request message to the external electronic device.

According to an embodiment, in operation 920, the external electronic device may receive connection information from the electronic device. Although not shown in the figure, the electronic device may determine whether to perform coupling of the external electronic device and the different external electronic device, based on device capability information and coupling information transmitted from the external electronic device. When the electronic device determines to perform the coupling of the external electronic device and the different external electronic device, the electronic device may transmit connection information required for coupling of the external electronic device and the different external electronic device to each of the external electronic device and the different external electronic device.

In an embodiment, the connection information may include information of the different external electronic device, required for coupling of the external electronic device and the different external electronic device. For example, the connection information may include a Bluetooth address (e.g., BD_ADDR) and/or device identifier of the different external electronic device.

In an embodiment, the connection information may include identification information (e.g., coupled ID, synced ID) randomly produced by the electronic device in order to be used in the coupling.

In an embodiment, the external electronic device may update coupling information, based on an identifier of the different external electronic device and any coupling identifier produced from the electronic device through the connection information. For example, the external electronic device may update coupling information as the identifier of the different external electronic device. In addition, for example, the external electronic device may update the coupling information as any coupling identifier (e.g., coupled ID, synced ID) produced from the electronic device.

Although not shown in the figure, the external electronic device may also receive the connection information from the different external electronic device, and may update the coupling information of the different external electronic device as any coupling identifier produced from the electronic device. As such, the external electronic device and the different external electronic device store each other as coupled devices, and thus coupling of the external electronic device and the different external electronic device may be performed.

According to an embodiment, in operation 930, the external electronic device may establish a third communication link. The third communication link may refer to a wireless communication link between the external electronic device and a different external electronic device.

In an embodiment, the external electronic device may transmit a third communication link connection request message to the different external electronic device. The external electronic device may receive a third communication link connection response message from the different external electronic device. Information required for communication between the external electronic device and the different external electronic device may be included in the third communication link connection request message and the third communication connection response message.

For example, information on a radio resource (e.g., information on a time/frequency resource) used in the third communication link may be included in the third communication link connection request message and the third communication link connection response message. In addition, for example, information required for synchronization of the external electronic device and the different external electronic device may be included in the third communication link connection request message and the third communication link connection response message.

In an embodiment, the third communication link may be used to adjust time synchronization of the external electronic device and the different external electronic device. Since each of the external electronic device and the different external electronic device operates by receiving a signal from the electronic device, synchronization may not match between the external electronic device and the different external electronic device due to a relative positional difference of the electronic device. The external electronic device and the different external electronic device may be synchronized to each other through the third communication link.

In an embodiment, the third communication link may be used to transfer the signal received from the electronic device. For example, when strength of the signal received by the external electronic device from the electronic device decreases to be less than or equal to a specific value, for effective signal reception, the external electronic device may receive the signal through the different external electronic device, instead of receiving the signal directly from the electronic device.

Figure 10A:
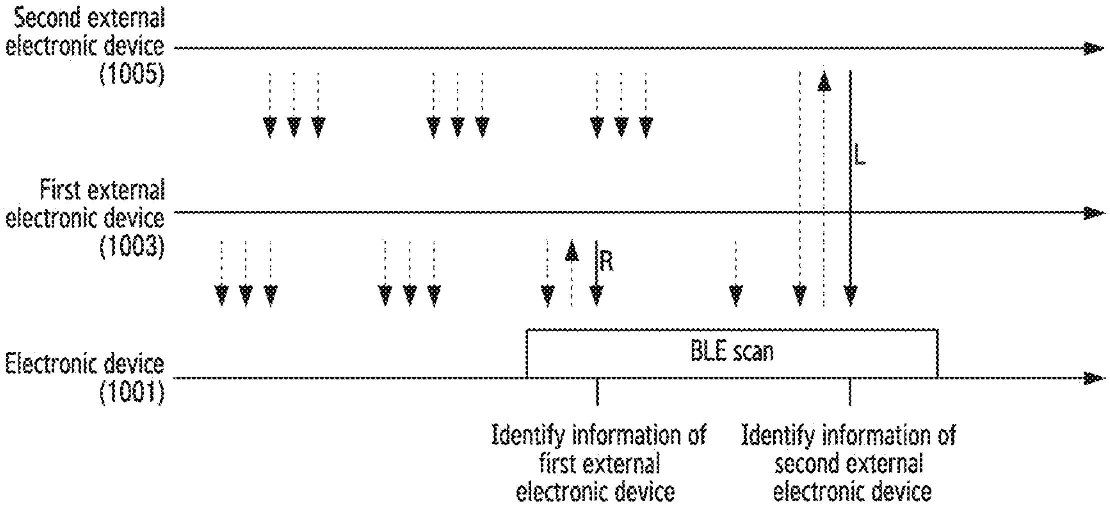
FIG. 10A to 10C illustrate an example of a time flow for identifying device information of an electronic device according to an embodiment of the disclosure.
Figure 10B:
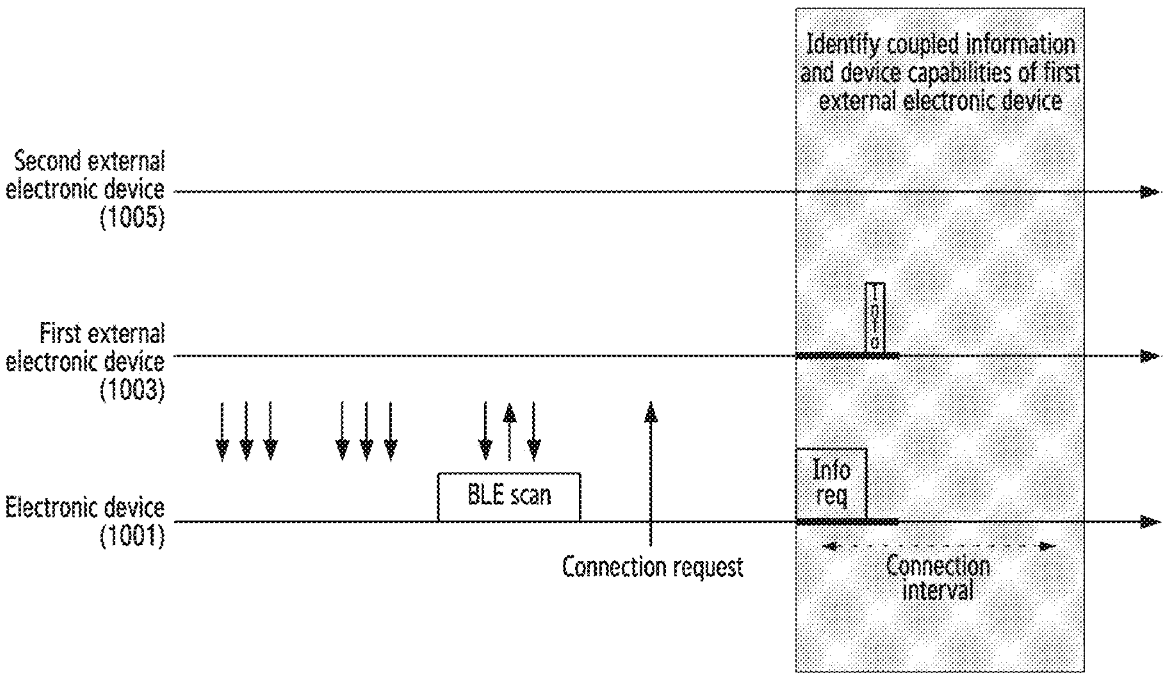
Figure 10C:
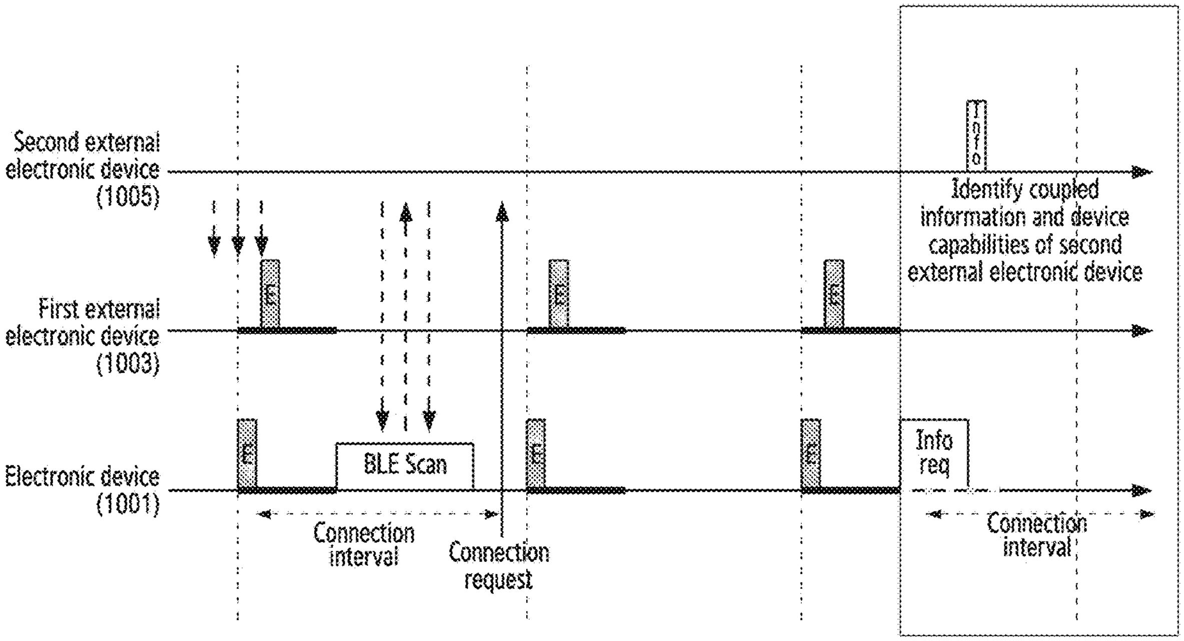

FIG. 10A to FIG. 10C illustrate an example of a time flow for identifying device information of an electronic device according to an embodiment of the disclosure. An electronic device 1001 of FIG. 10 may be a device corresponding to the electronic device 101 of FIG. 1, the electronic device 501 of FIG. 5, the electronic device 701 of FIG. 7, and the electronic device of FIG. 8. A first external electronic device 1003 of FIG. 10 may be a device corresponding to the first external electronic device 302 of FIG. 3, the first external electronic device 503 of FIG. 5A, the first external electronic device 703 of FIG. 7, and the second external electronic device of FIG. 8. A second external electronic device 1005 of FIG. 10 may be a device corresponding to the second external electronic device 302 of FIG. 3, the second external electronic device 505 of FIG. 5A, the external electronic device 705 of FIG. 7, and the second external electronic device of FIG. 8.

Referring to FIG. 10A, the electronic device 1001 may identify information of the first external electronic device 1001 and information of the second external electronic device 1005. The information of the first external electronic device 1003 may include device capability information and coupling information of the first external electronic device 1003. The information of the second external electronic device 1005 may include device capability information and coupling information of the second external electronic device 1005. An operation of the electronic device 1001 of FIG. 10A may be understood as that regarding a time of performing operations based on operations 730 and 740 of the electronic device 701 of FIG. 7 and operations based on operations 830 and 840 of the electronic device 801 of FIG. 8.

According to an embodiment, in order to decide whether to perform coupling of the first external electronic device 1003 and the second external electronic device 1005, the electronic device 1001 has to decide whether the first external electronic device 1003 and the second external electronic device 1005 are operable as a set and whether the first external electronic device 1003 and the second external electronic device 1005 have already been coupled. In order to decide this, the electronic device 1001 has to identify device capability information and coupling information received from the first external electronic device 1003 and device capability information and coupling information of the second external electronic device 1005. The device capability information and coupling information of the first external electronic device 1003 may be included in an advertising signal transmitted by the first external electronic device to adjacent devices, and the device capability information and coupling information of the second external electronic device 1005 may be included in an advertising signal transmitted by the second external electronic device to adjacent devices.

In an embodiment, for example, the electronic device 1001 decides whether the first external electronic device 1003 and the second external electronic device 1005 are operable as a set in an operation of receiving the advertising signal and whether the first external electronic device 1003 and the second external electronic device 1005 have already been coupled. As shown in FIG. 10A, the electronic device 1001 may identify information of the first external electronic device and information of the second external electronic device in a Bluetooth scan operation.

Referring to FIG. 10B, the electronic device 1001 may identify the information of the first external electronic device 1003. The information of the first external electronic device 1003 may include capability information and coupling information of the first external electronic device 1003. The operation of the electronic device 1001 of FIG. 10B may be understood as that regarding a time of performing operations based on operations 730 and 740 of the electronic device 701 of FIG. 7.

According to an embodiment, in order to decide whether to perform coupling of the first external electronic device 1003 and the second external electronic device 1005, the electronic device 1001 has to decide whether the first external electronic device 1003 and the second external electronic device 1005 are operable as a set and whether the first external electronic device 1003 and the second external electronic device 1005 have already been coupled. In order to decide this, the electronic device 1001 has to identify device capability information and coupling information received from the first external electronic device 1003. Referring to FIG. 10A, the device capability information and coupling information of the first external electronic device 1003 may be included in an advertising signal transmitted by the first external electronic device to adjacent devices.

In an embodiment, after receiving the advertising signal from the first external electronic device 1003, the electronic device 1001 may identify the device capability information and coupling information of the first external electronic device 1003 in the operation of establishing the first communication link. For example, as shown in FIG. 10B, after the Bluetooth scan, the electronic device 1001 may identify the device capability information and coupling information of the first external electronic device 1003 at a connection time (e.g., after a connection request).

Referring to FIG. 10C, the electronic device 1001 may identify information of the second external electronic device 1005. The information of the second external electronic device 1005 may include device capability information and coupling information of the second external electronic device 1005. An operation of the electronic device 1001 of FIG. 10C may be understood as that regarding a time of performing operations based on operations 730 and 740 of the electronic device 701 of FIG. 7 and operations based on operations 830 and 840 of the electronic device 801 of FIG. 8.

According to an embodiment, in order to decide whether to perform coupling of the first external electronic device 1003 and the second external electronic device 1005, the electronic device 1001 has to decide whether the first external electronic device 1003 and the second external electronic device 1005 are operable as a set and whether the first external electronic device 1003 and the second external electronic device 1005 have already been coupled. In order to decide this, the electronic device 1001 has to identify device capability information and coupling information of the second external electronic device 1005. The device capability information and coupling information of the second external electronic device 1005 may be included in an advertising signal transmitted by the second external electronic device to adjacent devices.

In an embodiment, after receiving the advertising signal from the second external electronic device 1005, the electronic device 1001 may identify the device capability information and coupling information of the second external electronic device 1005 in the operation of establishing the second communication link. For example, as shown in FIG. 10C, after the Bluetooth scan, the electronic device 1001 may identify the device capability information and coupling information of the second external electronic device 1005 at a connection time (e.g., after a connection request) or after establishing the second communication link.

Figure 11A:
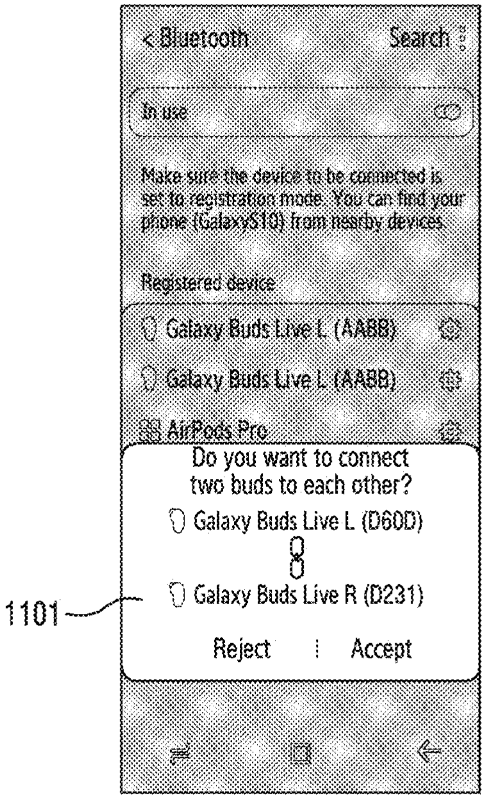
FIG. 11A to 11C illustrate an example of a user interface according to an embodiment of the disclosure.
Figure 11B:
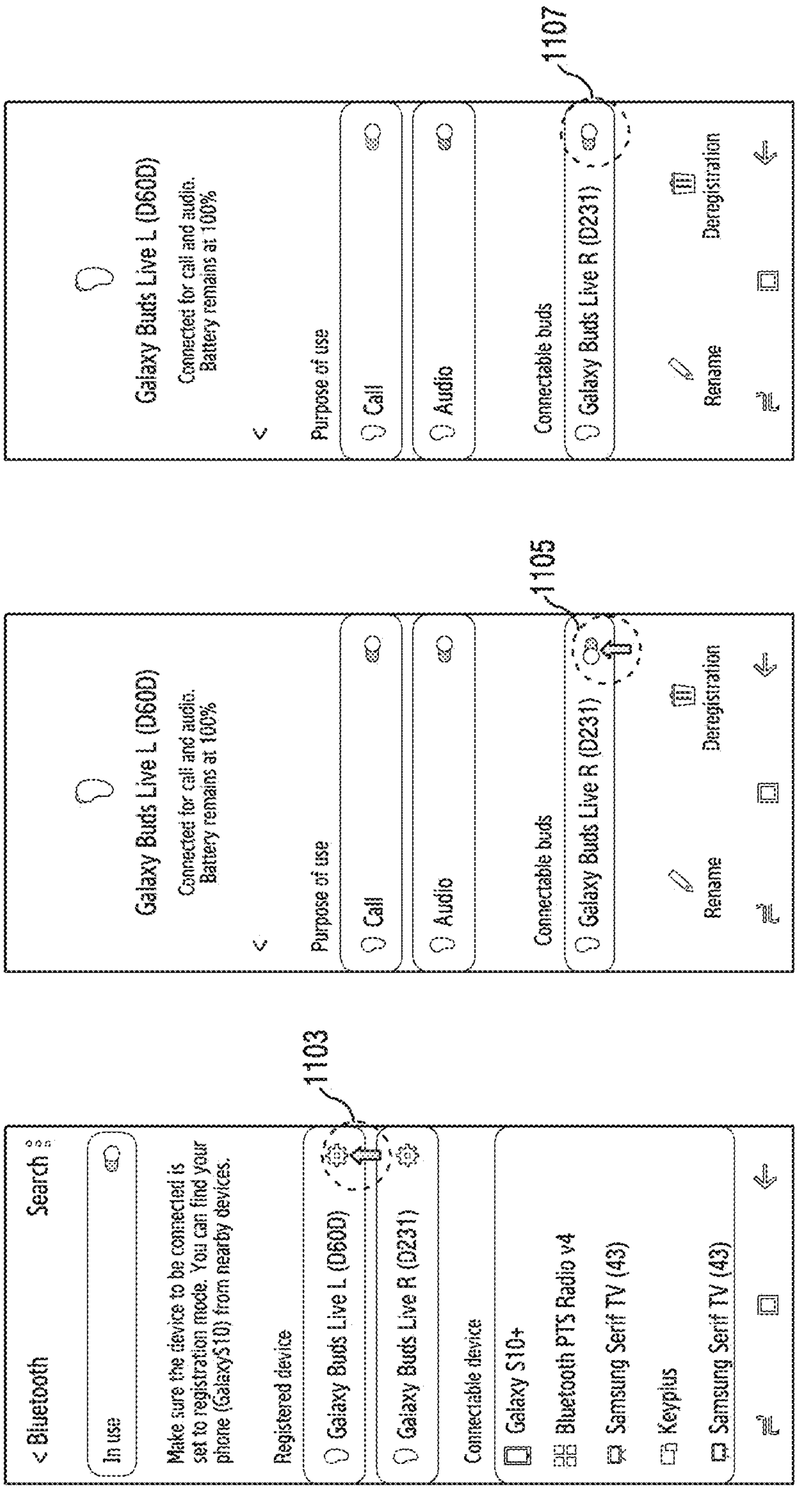
Figure 11C:
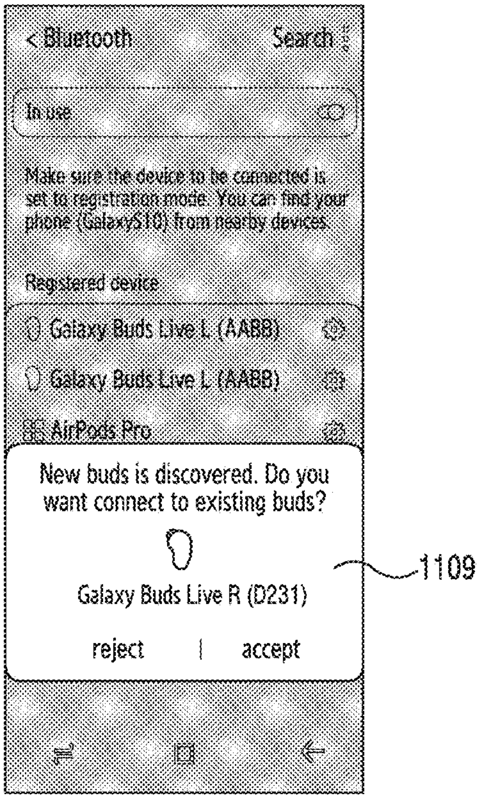

FIG. 11A to FIG. 11C illustrate an example of a user interface according to an embodiment of the disclosure.

An electronic device of FIG. 11A to FIG. 11C may be a device corresponding to the electronic device 101 of FIG. 1, the electronic device 501 of FIG. 5, the electronic device 701 of FIG. 7, and the electronic device of FIG. 8. A first external electronic device of FIG. 11A to FIG. 11C may be a device corresponding to the electronic device 200 of FIG. 2, the first external electronic device 503 of FIG. 5A, the first external electronic device 703 of FIG. 7, and the external electronic device of FIG. 9. A second external electronic device of FIG. 11A to FIG. 11C may be the second external electronic device 302 of FIG. 3, the second external electronic device 505 of FIG. 5A, the external electronic device 705 of FIG. 7, and the external electronic device of FIG. 9. A user interface of FIG. 11A to FIG. 11C is only an example, and thus the scope of the disclosure is not limited thereto. Although Galaxy Buds are taken for example in the description of FIG. 11A to FIG. 11C, the scope of the disclosure is not limited thereto, and the scope of the disclosure may also include an operation of separate external electronic devices using BLE communication.

FIG. 11A illustrates an example of a user interface according to an embodiment. Specifically, this is an example of a user interface indicated in operation 740 of FIG. 7.

In an embodiment, the user interface for the coupling may include an object (e.g., a popup window 1101) for determining whether to perform coupling of a first external electronic device and a second external electronic device. The object for determining whether to perform the coupling may include information (e.g., Galaxy Buds Live L(D60d), Galaxy Buds Live R (D231) indicating external electronic devices to be coupled. The object for determining whether to perform the coupling may include an object for receiving a user input regarding whether to release the coupling for the external electronic devices. For example, referring to FIG. 11A, an object (e.g., 'accept', 'reject') for receiving the user input regarding whether to perform the coupling may be included in the user interface.

FIG. 11B illustrates an example of a user interface according to an embodiment of the disclosure. FIG. 11B relates to a user interface for updating coupling information of an external electronic device connected to an electronic device.

In an embodiment, the user interface may include an object for enabling (ON/OFF) a Bluetooth connection function. For example, referring to FIG. 11B, the user interface may include a slide bar displayed side by side with 'in use', as the object for enabling the Bluetooth connection function.

In an embodiment, the user interface may include a list including an object indicating a registered registration device. The registration device list may refer to a list of electronic devices registered for a Bluetooth connection with the electronic device. For example, referring to FIG. 4, the user interface may include a list which enumerates the registered devices, such as 'Galaxy Buds Live L (D60D)', 'Galaxy Buds Live R(D231)', as the object indicating the devices registered to the electronic device.

In an embodiment, the user interface may include an object indicating each of external electronic devices constituting one set of external electronic devices. When a pair of external electronic devices (e.g., ear buds) constructed of two or more external electronic devices is registered to the electronic device, an object indicating each of the external electronic devices (e.g., the left ear bud, the right ear bud) constituting the pair of external electronic devices may be separately included in the user interface. For example, referring to FIG. 11B, a pair of external electronic devices is not displayed in a list of registerable devices as an object indicating one set but may be included as separate objects such as Galaxy Buds Live L(D60D)', 'Galaxy Buds Live R(D231)'.

In an embodiment, the user interface may include a list including an object indicating connectable devices. The connectable device list may include electronic devices to which a Bluetooth connection with the electronic device is possible. For example, referring to FIG. 11, the user interface may include an object (e.g., 'Gakaxy S10+', 'Bluetooth PTS Radio v4,' 'Samsung Serif TV(43)') indicating a device connectable to the electronic device.

In an embodiment, the electronic device may enable or disable a Bluetooth connection function, based on a user interface identified in the object for enabling the Bluetooth connection function. For example, upon identifying a user input in which a slide bar related to the Bluetooth connection function is set to a first direction, the electronic device may enable the Bluetooth connection function. In addition, for example, upon identifying a user input in which the slide bar related to the Bluetooth connection function is set to a second direction, the electronic device may disable the Bluetooth connection function.

The electronic device may update coupling information of the external electronic device connected to the electronic device, based on the user input identified in the object indicating the registration device.

In an embodiment, referring to FIG. 11B, upon identifying a user input 1103 for an object indicating an external electronic device (e.g., Galaxy Buds Live L(D60D)), included in the user interface, a window for coupling of the external electronic device (e.g., Galaxy Buds Live L(D60D)) may be displayed. After displaying the window for coupling of the external electronic devices, a different external electronic device may be coupled by identifying a user input 1105 (e.g., the slide bar set to the first direction) for an object (e.g., Galaxy Buds Live R (D231)) indicating the different external electronic device (e.g., Galaxy Buds Live R(D231)) to which coupling is possible. Thereafter, an object 1107 (e.g., the slide bar set to the second direction opposite to the first direction) indicating that the coupling with the different external electronic device is complete may be displayed on the user interface.

In an embodiment, the user interface for the coupling may include an object for renaming a device connected to the electronic device or for deregistration. For example, referring to FIG. 11B, the user interface may include an object (e.g., 'renaming') for receiving a user input for renaming the connected external electronic device or an object (e.g., 'deregistration') for receiving a user input for disconnection.

FIG. 11C illustrates another example of a user interface for coupling according to an embodiment of the disclosure.

Referring to FIG. 11C, a user interface which may be displayed when a different external electronic device (e.g., Galaxy Buds live R (D231)) is connected is illustrated in the presence of an external electronic device (e.g., Galaxy Buds Live L (AABB)) previously connected to an electronic device. The user interface for the coupling may include content 1109 to receive a user input for performing coupling between external electronic devices previously connected to the different external electronic device.

FIG. 11C illustrates another example of a user interface according to an embodiment of the disclosure. FIG. 11C may be understood as an example of a user interface for providing coupling between a previously registered external electronic device and a different external electronic device, upon identifying the different electronic device not registered previously to an electronic device.

In an embodiment, the user interface may include an object (e.g., a popup window 1109) for determining whether to perform coupling between the external electronic device previously registered and the different external electronic device previously not registered. The object 1109 for determining whether to perform the coupling may include an object (e.g., Galaxy Buds Live R (D231)) indicating information of the different external electronic device not registered to the electronic device. The object for determining whether to perform the coupling may include an input for receiving the user input regarding whether to perform coupling on external electronic devices. For example, referring to FIG. 11C, an object (e.g., 'accept', 'reject') for receiving the user input regarding whether to perform the coupling may be included. Regarding whether to perform the coupling, upon identifying a user input (e.g., 'accept') for receiving an input (e.g., 'reject') of a user intending to perform the coupling, the electronic device may perform the coupling of the external electronic device and the different external electronic device. Regarding whether to perform the coupling, upon identifying an input ('reject') of a user not indenting to perform the coupling, the electronic device may not perform the coupling of the external electronic device and the different external electronic device.

Figure 12:
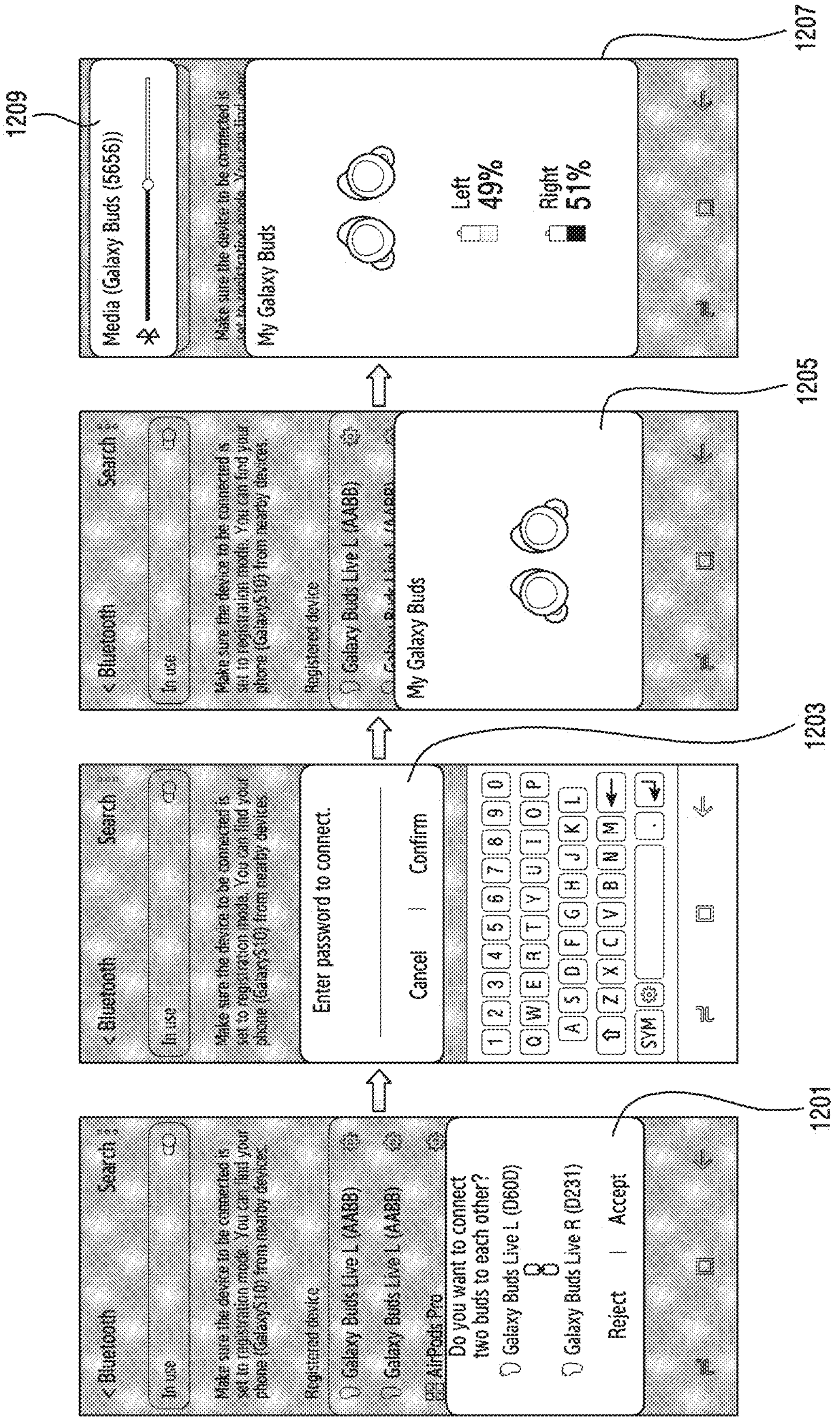
FIG. 12 illustrates another example of a user interface according to an embodiment of the disclosure.

FIG. 12 illustrates an example of a user interface according to an embodiment. An electronic device of FIG. 12 may be the electronic device 101 of FIG. 1 and the electronic device 501 of FIG. 5. A first external electronic device of FIG. 12 may be a device corresponding to the first external electronic device 301 of FIG. 3 and the external electronic device 503 of FIG. 5A. A second external electronic device of FIG. 12 may be a device corresponding to the second external electronic device 302 of FIG. 3 and the second external electronic device 505 of FIG. 5A. FIG. 12 relates to an example of a flow in which the user interface is displayed to perform coupling. The user interface of FIG. 12 is only an example, and thus the scope of the disclosure is not limited thereto. Although Galaxy Buds are taken for example in the description of FIG. 12, the scope of the disclosure is not limited thereto, and the scope of the disclosure may also include an operation of separate external electronic devices using BLE communication.

The electronic device may establish a first communication link with the first external electronic device and establish a second communication link with the second external electronic device. After establishing the first communication link and the second communication link, the electronic device may display a user interface for coupling of the first external electronic device and the second external electronic device. The user interface for the coupling may be displayed on a display of the electronic device after identifying a user input for an object included in the user interface of FIG. 4 (e.g., an object indicating the external electronic device).

In an embodiment, the user interface for the coupling may include an object (e.g., a popup window 1201) for determining whether to perform coupling of the first external electronic device and the second external electronic device. The object for determining whether to perform the coupling may include information (e.g., Galaxy Buds Live L(D120d), Galaxy Buds Live R (D231)) indicating external electronic devices to be coupled. The object for determining whether to perform the coupling may include an object for receiving a user input regarding whether to release the coupling for the external electronic devices. For example, referring to FIG. 12, an object (e.g., 'accept', 'reject') for receiving the user input regarding whether to perform the coupling may be included in the user interface.

In an embodiment, the electronic device may store a security key for updating coupling information and device capability information of external electronic devices. For example, the external electronic devices may have an initialized password in a default state when shipped from a factory or a specific state such as factory initialization. Thereafter, a user may input a password when connecting (e.g., paring) to the external electronic device. Thereafter, an authentication procedure using the password may be added to update coupling information or device capability information according to user's intention.

In an embodiment, the electronic device may perform an operation of authenticating the user through account information, password, or the like set by the user, before updating the coupling information or device capability information of the external electronic devices.

In an embodiment, referring to FIG. 12, the user interface may include an object (e.g., a popup window 1203) for inputting a security key in order for the electronic device to update the coupling information or device capability information of the external electronic devices. For example, the user interface for inputting the security key required for the coupling may be displayed on a screen in the object for inputting the security key as illustrated.

In an embodiment, the electronic device may display a user interface indicating that the coupling is successful. The user interface indicating that the coupling is successful may include an object 1205 indicating that the coupling of the first external electronic device and the second external electronic device is successful. For example, when a correct security key is identified in the popup window 1203, the electronic device may recognize that the coupling is successful, by performing the operation for the coupling (described in detail with reference to FIG. 7 and FIG. 8). Upon recognizing that the coupling is successful, the electronic device may display, side by side, an object indicating that the coupling of the first external electronic device and the second external electronic device is successful (e.g., a popup window including an icon indicating the first external electronic device and the second external electronic device).

In an embodiment, the user interface for the coupling may include an object indicating device information of the first external electronic device and second external electronic device. After displaying the object 1205 indicating that the coupling is successful, the electronic device may display a user interface including an object indicating device information of currently coupled external electronic devices. For example, referring to FIG. 12, an object indicating the device information of the currently coupled external electronic devices may include an object (e.g., 'left: 0%', 'Right: 51%') indicating remaining battery level information 1207 of the currently coupled external electronic devices. In addition, for example, the object indicating the device information of the currently coupled external electronic devices may include volume information 1209 (e.g., a slide bar which indicates volume) of the external electronic devices.

Figure 13A:
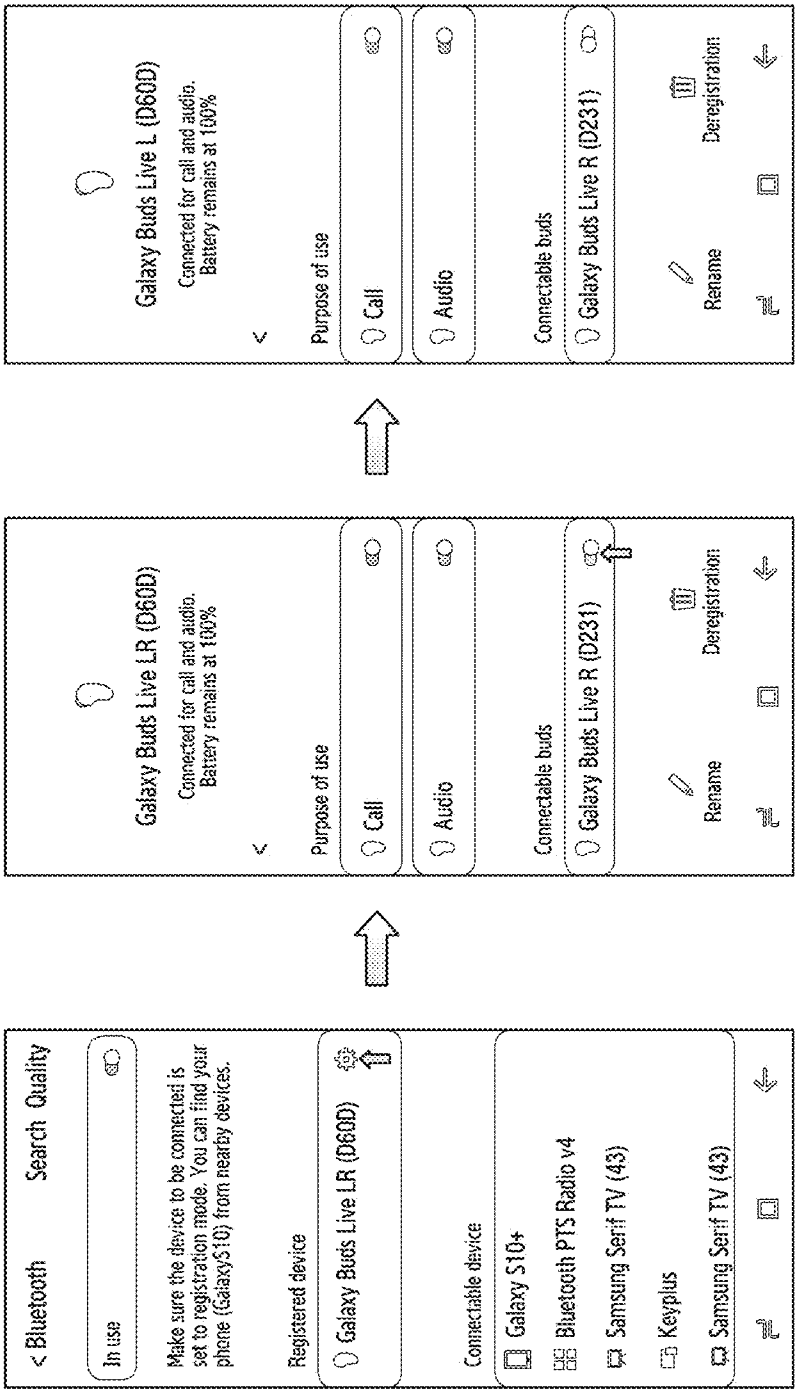
FIGS. 13A and 13B illustrate another example of a user interface according to an embodiment of the disclosure.
Figure 13B:
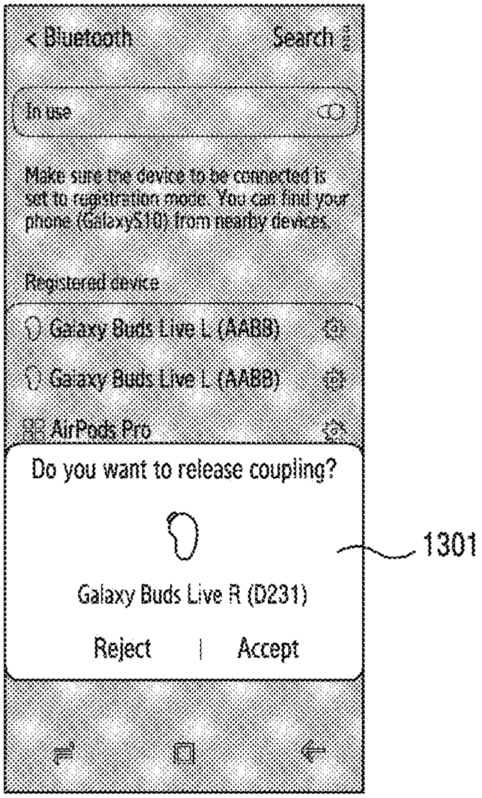

FIG. 13A and FIG. 13B illustrate another example of a user interface according to an embodiment of the disclosure.

An electronic device may perform coupling between external electronic devices. On the contrary, however, there may be a case where it is not necessary to release the coupling of the external electronic devices which have already coupled. For example, in a pair of ear burs previously used by a user, any one ear bud (e.g., a left ear bud) may suffer from performance deterioration. In this case, the user may have to purchase the left ear bud and perform coupling with a right ear bud previously used. In order to couple the newly purchased left ear bud and the previously used right ear bud, it may be necessary to release coupling of the existing left ear bud and right ear bud which have already been coupled. The user interface of FIG. 13A and FIG. 13B relates to an example of a user interface required to release the coupling of the existing coupled external electronic devices.

FIG. 13A illustrates an example of a user interface according to an embodiment of the disclosure. FIG. 13A relates to a user interface for releasing coupling with external electronic devices connected to an electronic device.

In an embodiment, the user interface may include an object for enabling (ON/OFF) a Bluetooth connection function. For example, referring to FIG. 13A, the user interface may include a slide bar displayed side by side with 'in use', as the object for enabling the Bluetooth connection function.

In an embodiment, the user interface may include a list including an object indicating a registered registration device. The registration device list may refer to a list of electronic devices registered for a Bluetooth connection with the electronic device. For example, referring to FIG. 4, the user interface may include a list which enumerates the registered devices, such as 'Galaxy Buds Live L (D60D)', as the object indicating the devices registered to the electronic device.

In an embodiment, the user interface may include an object indicating each of external electronic devices constituting one set of external electronic devices. When a pair of external electronic devices (e.g., ear buds) constructed of two or more external electronic devices is registered to the electronic device, an object indicating each of the external electronic devices (e.g., the left ear bud, the right ear bud) constituting the pair of external electronic devices may be separately included in the user interface. For example, referring to FIG. 11B, a pair of external electronic devices is not displayed in a list of registerable devices as an object indicating one set but may be included as separate objects such as Galaxy Buds Live L(D60D)', 'Galaxy Buds Live R(D231)'.

In an embodiment, the user interface may include a list including an object indicating connectable devices. The connectable device list may include electronic devices to which a Bluetooth connection with the electronic device is possible. For example, referring to FIG. 11, the user interface may include an object (e.g., 'Gakaxy S10+', 'Bluetooth PTS Radio v4,' 'Samsung Serif TV(43)') indicating a device connected to the electronic device.

In an embodiment, the electronic device may enable or disable a Bluetooth connection function, based on a user interface identified in the object for enabling the Bluetooth connection function. For example, upon identifying a user input in which a slide bar related to the Bluetooth connection function is set to a first direction, the electronic device may enable the Bluetooth connection function. In addition, for example, upon identifying a user input in which the slide bar related to the Bluetooth connection function is set to a second direction, the electronic device may disable the Bluetooth connection function.

The electronic device may release coupling information of the external electronic device connected to the electronic device, based on the user input identified in the object indicating the registration device.

In an embodiment, referring to FIG. 13A, upon identifying the user input for the object indicating the external electronic device (e.g., Galaxy Buds Live L(D60D)), included in the user interface, a window for releasing the coupling of the external electronic device (e.g., Galaxy Buds Live L(D60D)) may be displayed. After displaying the window for releasing the coupling of the external electronic devices, the electronic device may identify a user input (e.g., an operation of dragging or touching a slide bar, which is set to a first direction, in a second direction opposite to the first direction) for an object (e.g., Galaxy Buds Live R (D231)) indicating a different electronic device currently coupled to the external electronic device to release the coupling with the different external electronic device. Thereafter, an object (e.g., a slide bar set to the second direction opposite to the first direction) indicating that the coupling with the different external electronic device is released may be displayed on the user interface.

In an embodiment, the user interface for the coupling may include an object for renaming a device connected to the electronic device or for deregistration. For example, referring to FIG. 13A, the user interface may include an object (e.g., 'renaming') for receiving a user input for renaming the connected external electronic device or an object (e.g., 'deregistration') for receiving a user input for disconnection.

FIG. 13B illustrates another example of a user interface according to an embodiment of the disclosure. FIG. 11A illustrates an example of a user interface according to an embodiment.

In an embodiment, a user interface for releasing coupling may include an object (e.g., a popup window 1301) for determining whether to release coupling between a first external electronic device and a second external electronic device. The object for determining whether to perform coupling may include information (e.g., Galaxy Buds Live R (D231)) indicating an external electronic device to be decoupled. The object for determining whether to release the coupling may include an object for receiving a user input regarding whether to release the coupling for external electronic devices. For example, referring to FIG. 13B, an object (e.g., 'accept', 'reject') for receiving the user input regarding whether to perform the coupling may be included in the user interface.

Referring to FIG. 13B, a screen for inducing the release of the coupling between external electronic devices coupled to the electronic device may be displayed on the user interface. For example, an icon (e.g., 'accept', 'reject') related to a currently coupled external electronic device and whether to release the connection thereto may be included in the user interface.

An electronic device according to an embodiment of the disclosure described above may include a transceiver, a display, and at least one processor operatively coupled to the transceiver and the display. The at least one processor may be configured to receive, from a first external electronic device, device capability information and coupling information of the first external electronic device, receive, from a second external electronic device, device capability information and coupling information of the second external electronic device, decide whether the first external electronic device and the second external electronic device are operable as a set, based on the device capability information of the first external electronic device and the device capability information of the second external electronic device, decide whether to display a user interface for the coupling, based on the coupling information of the first external electronic device and the coupling information of the second external electronic device upon deciding that the first external electronic device and the second external electronic device are operable as the set, display the user interface for the coupling through the display upon deciding to display the user interface for the coupling, identify a user input through the user interface for the coupling, displayed through the display, and transmit first connection information to the first external electronic device and transmit second connection information to the second external electronic device, in response to identifying the user input.

In an embodiment, the device capability information of the first external electronic device may include channel direction information and/or supportable audio channel information of the first external electronic device. The device capability information of the second external electronic device may include channel direction information and/or supportable audio channel information of the second external electronic device.

In an embodiment, the at least one processor may be configured to decide that the first external electronic device and the second external electronic device are operable as the set, when the channel direction information of the first external electronic device differs from the channel direction information of the second external electronic device.

In an embodiment, the at least one processor may be configured to determine to display the user interface for the coupling, when coupling information of the first external electronic device differs from coupling information of the second external electronic device.

In an embodiment, the at least one processor may be configured to determine to display a user interface for the coupling, when coupling information of the first external electronic device and/or coupling information of the second external electronic device is not present.

In an embodiment, the user interface for the coupling may include an icon for receiving a user input regarding whether to perform coupling of the first external electronic device and the second external electronic device.

In an embodiment, the first connection information may include device capability information and coupling information of the second external electronic device, and the second connection information may include device capability information and coupling information of the first external electronic device.

In an embodiment, the at least one processor may be configured to display a user interface for releasing the coupling of the first external electronic device and the second external electronic device.

In addition, a method of operating an electronic device according to an embodiment of the disclosure described above may include receiving, from a first external electronic device, device capability information and coupling information of the first external electronic device, receiving, from a second external electronic device, device capability information and coupling information of the second external electronic device, deciding whether the first external electronic device and the second external electronic device are operable as a set, based on the device capability information of the first external electronic device and the device capability information of the second external electronic device, deciding whether to display a user interface for the coupling, based on the coupling information of the first external electronic device and the coupling information of the second external electronic device upon deciding that the first external electronic device and the second external electronic device are operable as the set, displaying the user interface for the coupling through the display upon deciding to display the user interface for the coupling, identifying a user input through the user interface for the coupling, displayed through the display, and transmitting first connection information to the first external electronic device and transmitting second connection information to the second external electronic device, in response to identifying the user input.

In an embodiment, the device capability information of the first external electronic device may include channel direction information and/or supportable audio channel information of the first external electronic device. The device capability information of the second external electronic device may include channel direction information and/or supportable audio channel information of the second external electronic device.

In an embodiment, the deciding of whether the first external electronic device and the second external electronic device are operable as the set may include deciding that the first external electronic device and the second external electronic device are operable as the set, when the channel direction information of the first external electronic device differs from the channel direction information of the second external electronic device.

In an embodiment, the deciding of whether to display the user interface for the coupling may include deciding to display the user interface for the coupling, when coupling information of the first external electronic device differs from coupling information of the second external electronic device.

In an embodiment, the method may further include determining to display a user interface for the coupling, when coupling information of the first external electronic device and/or coupling information of the second external electronic device is not present.

In an embodiment, the user interface for the coupling may include an icon for receiving a user input regarding whether to perform coupling of the first external electronic device and the second external electronic device.

In an embodiment, the first connection information may include device capability information and coupling information of the second external electronic device, and the second connection information may include device capability information and coupling information of the first external electronic device.

In an embodiment, the method may further include displaying a user interface for releasing the coupling of the first external electronic device and the second external electronic device.

In addition, an external electronic device according to an embodiment of the disclosure described above may include a transceiver and at least one processor operatively coupled to the transceiver. The at least one processor may be configured to transmit a message including device capability information and coupling information to an electronic device, receive connection information produced based on the device capability information and the coupling information from the electronic device, transmit a third communication link connection request message to a different external electronic device, and receive a third communication link connection response message from the different external electronic device.

In an embodiment, the at least one processor may be configured to receive data from the electronic device and transmit the data to the different external electronic device.

In an embodiment, the device capability information may include channel direction information of the external electronic device and/or supportable audio channel information.

In an embodiment, the connection information may include coupling information of the different external electronic device.

Methods based on the embodiments disclosed in the claims and/or specification of the disclosure may be implemented in hardware, software, or a combination of both.

When implemented in software, computer readable recording medium for storing one or more programs (i.e., software modules) may be provided. The one or more programs stored in the computer readable recording medium are configured for execution performed by one or more processors in the electronic device. The one or more programs include instructions for allowing the electronic device to execute the methods based on the embodiments disclosed in the claims and/or specification of the disclosure.

The program (i.e., the software module or software) may be stored in a random access memory, a non-volatile memory including a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs) or other forms of optical storage devices, and a magnetic cassette. Alternatively, the program may be stored in memory configured in combination of all or some of these storage media. In addition, the configured memory may be plural in number.

Further, the program may be stored in an attachable storage device capable of accessing the electronic device through a communication network such as the Internet, an Intranet, a Local Area Network (LAN), a Wide LAN (WLAN), or a Storage Area Network (SAN) or a communication network configured by combining the networks. The storage device may have access to a device for performing an embodiment of the disclosure via an external port. In addition, an additional storage device on a communication network may have access to the device for performing the embodiment of the disclosure.

In the aforementioned specific embodiments of the disclosure, a component included in the disclosure is expressed in a singular or plural form according to the specific embodiment proposed herein. However, the singular or plural expression is selected properly for a situation proposed for the convenience of explanation, and thus the various embodiments of the disclosure are not limited to a single or a plurality of components. Therefore, a component expressed in a plural form may also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

The invention claimed is:

1. An electronic device comprising:

a transceiver;

a display;

at least one processor; and memory storing instructions that, when executed by the processor, individually or collectively, cause the electronic device to:

establish a first communication link with a first external electronic device and a second communication link with a second external electronic device;

receive first device capability information and first coupling information through the first communication link, wherein the first device capability information includes at least one of a channel direction information or supportable audio channel information of the first external electronic device;

receive second device capability information and second coupling information through the second communication link, wherein the second device capability information includes at least one of channel direction information or supportable audio channel information of the second external electronic device;

determine whether the first external electronic device and the second external electronic device are operable as a set, based on whether the information on the channel direction of the first external electronic device and the information on the channel direction of the second external electronic device are different from each other, and based on whether the first coupling information and the second coupling information indicate that the first external electronic device and the second external electronic device are not yet coupled with each other; and display a user interface for coupling of the first external electronic device and the second external electronic device, based on the first coupling information and the second coupling information, upon determining that the first external electronic device and the second external electronic device are operable as the set.

2. The electronic device of claim 1, wherein the first coupling information includes at least one of a Bluetooth address (coupled ID) or a synchronized identifier (synced ID) of the first external electronic device, and wherein the second coupling information includes at least one of a coupled ID or a synced ID of the second external electronic device.

3. The electronic device of claim 2, wherein the instructions, when executed by the processor further cause the electronic device to:

identify whether the first external electronic device and the second external electronic device are coupled based on the first coupling information and the second coupling information;

display a user interface for performing the coupling of the first external electronic device and the second external electronic device when in a state where the first external electronic device and the second external electronic device are not coupled; and display a user interface for releasing the coupling of the first external electronic device and the second external electronic device when in a state where the first external electronic device and the second external electronic device are coupled.

4. The electronic device of claim 1, wherein the user interface for the coupling includes an object for receiving a user input for performing the coupling of the first external electronic device and the second external electronic device.

5. The electronic device of claim 4, wherein the instructions, when executed by the processor further cause the electronic device to:

receive the user input through the object for receiving the user input; and transmit first connection information through the first communication link and transmit second connection information through the second communication link, in response to the receiving of the user input.

6. The electronic device of claim 1, wherein the instructions, when executed by the processor further cause the electronic device to:

transmit a connection request signal to the first external electronic device, in response to identifying a first scanning signal received from the first external electronic device; and transmit a connection request signal to the second external electronic device, in response to identifying a second scanning signal received from the second external electronic device.

7. The electronic device of claim 1, wherein the instructions, when executed by the processor further cause the electronic device to:

based on a user input through the user interface, update the first coupling information and the second coupling information.

8. A method of operating an electronic device, the method comprising:

establishing a first communication link with a first external electronic device and a second communication link with a second external electronic device;

receiving first device capability information and first coupling information through the first communication link, wherein the first device capability information includes at least one of a channel direction information or supportable audio channel information of the first external electronic device;

receiving second device capability information and second coupling information through the second communication link, wherein the second device capability information includes at least one of channel direction information or supportable audio channel information of the second external electronic device;

determining whether the first external electronic device and the second external electronic device are operable as a set, based on whether the information on the channel direction of the first external electronic device and the information on the channel direction of the second external electronic device are different from each other, and based on whether the first coupling information and the second coupling information indicate that the first external electronic device and the second external electronic device are not yet coupled with each other; and displaying a user interface for coupling of the first external electronic device and the second external electronic device, based on the first coupling information and the second coupling information, upon determining that the first external electronic device and the second external electronic device are operable as the set.

9. The method of claim 8, wherein the first coupling information includes at least one of a coupled ID or a synced ID of the first external electronic device, and wherein the second coupling information includes at least one of a coupled ID or a synced ID of the second external electronic device.

10. The method of claim 9, further comprising:

identifying whether the first external electronic device and the second external electronic device are coupled based on the first coupling information and the second coupling information;

displaying a user interface for performing the coupling of the first external electronic device and the second external electronic device when in a state where the first external electronic device and the second external electronic device are not coupled; and displaying a user interface for releasing the coupling of the first external electronic device and the second external electronic device when in a state where the first external electronic device and the second external electronic device are coupled.

11. The method of claim 8, wherein the user interface for the coupling includes an object for receiving a user input for performing the coupling of the first external electronic device and the second external electronic device, and the method further comprises:

receiving the user input through the object for receiving the user input; and transmitting first connection information through the first communication link and transmit second connection information through the second communication link, in response to the receiving of the user input.

12. The method of claim 8, further comprising:

transmitting a connection request signal to the first external electronic device, in response to identifying a first scanning signal received from the first external electronic device; and transmitting a connection request signal to the second external electronic device, in response to identifying a second scanning signal received from the second external electronic device.

13. The method of claim 11, further comprising:

receiving user input using the object for receiving the user input;

transmitting first connection information through the first communication link and second connection information through the second communication link, in response to receiving said user input.

* * * * *